United States Patent
Fujioka et al.

(10) Patent No.: US 12,031,491 B2
(45) Date of Patent: Jul. 9, 2024

(54) COMBUSTION ADJUSTMENT METHOD AND COMBUSTION CONTROL DEVICE OF GAS TURBINE

(71) Applicant: MITSUBISHI HEAVY INDUSTRIES, LTD., Tokyo (JP)

(72) Inventors: Yutaro Fujioka, Yokohama (JP); Tsukasa Ito, Yokohama (JP); Fumikatsu Inoue, Yokohama (JP); Ryoichi Haga, Yokohama (JP); Takahiro Ito, Kobe (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/032,937

(22) PCT Filed: Oct. 20, 2021

(86) PCT No.: PCT/JP2021/038719
§ 371 (c)(1),
(2) Date: Apr. 20, 2023

(87) PCT Pub. No.: WO2022/091899
PCT Pub. Date: May 5, 2022

(65) Prior Publication Data
US 2023/0392789 A1 Dec. 7, 2023

(30) Foreign Application Priority Data
Oct. 28, 2020 (JP) ................................. 2020-180324

(51) Int. Cl.
*F02C 9/28* (2006.01)
*F02C 9/26* (2006.01)
(Continued)

(52) U.S. Cl.
CPC ................ *F02C 9/28* (2013.01); *F02C 9/263* (2013.01); *F02C 9/32* (2013.01); *F02C 9/54* (2013.01)

(58) Field of Classification Search
CPC .... F02C 9/28; F02C 9/263; F02C 9/32; F02C 9/54
See application file for complete search history.

(56) References Cited

U.S. PATENT DOCUMENTS

| 10,746,106 B2 * | 8/2020 | Yamamoto ................ F02C 9/20 |
| 2011/0004390 A1 | 1/2011 | Nomura et al. |

(Continued)

FOREIGN PATENT DOCUMENTS

| CN | 110195715 | 9/2019 |
| JP | 2010-84523 | 4/2010 |

(Continued)

OTHER PUBLICATIONS

International Search Report issued Dec. 14, 2021 in corresponding International Application No. PCT/JP2021/038719, with English language translation.

(Continued)

*Primary Examiner* — William H Rodriguez
(74) *Attorney, Agent, or Firm* — Wenderoth, Lind & Ponack, L.L.P.

(57) ABSTRACT

This combustion adjustment method applied to the combustion control of a combustor executes a first step for selecting a combustion parameter for a load of a gas turbine and increasing or decreasing a command value of the combustion parameter from an original location. When the command value reaches a target tolerance upper limit value or a target tolerance lower limit value, the first step is terminated. Furthermore, a second step for decreasing or increasing the command value in a direction opposite to that of the first step (Continued)

is executed. When the command value reaches the target tolerance upper limit value or the target tolerance lower limit value, the present invention includes a combustion tolerance confirmation step for confirming a combustion tolerance range of the combustion parameter at which the second step is terminated.

22 Claims, 15 Drawing Sheets

(51) Int. Cl.
  *F02C 9/32* (2006.01)
  *F02C 9/54* (2006.01)

(56) References Cited

U.S. PATENT DOCUMENTS

| | | | |
|---|---|---|---|
| 2014/0165581 A1* | 6/2014 | Terry | F02C 9/00 60/793 |
| 2014/0216047 A1 | 8/2014 | Morisaki et al. | |
| 2018/0223743 A1* | 8/2018 | Yamamoto | F02C 7/228 |

FOREIGN PATENT DOCUMENTS

| | | |
|---|---|---|
| JP | 2011-149361 | 8/2011 |
| JP | 2014-148933 | 8/2014 |

OTHER PUBLICATIONS

Written Opinion of the International Searching Authority issued Dec. 14, 2021 in corresponding International Application No. PCT/JP2021/038719, with English language translation.

* cited by examiner

COMBUSTION ADJUSTMENT METHOD AND COMBUSTION CONTROL DEVICE OF GAS TURBINE

TECHNICAL FIELD

The present disclosure relates to a combustion adjustment method and a combustion control device of a gas turbine.

This application claims the right of priority based on Japanese Patent Application No. 2020-180324 filed with the Japan Patent Office on Oct. 28, 2020, the content of which is incorporated herein by reference.

BACKGROUND ART

In order to stably operate a gas turbine, it is important to establish operating conditions in which combustion oscillation can be suppressed within an allowable level. Therefore, various proposals have been made regarding a combustion adjustment method for predicting the occurrence of combustion oscillation and suppressing combustion oscillation within an allowable level, and correction means for a combustion control device. PTL 1 discloses an example in which after a gas turbine enters normal operation, the occurrence of combustion oscillation is predicted and operating conditions for suppressing the combustion oscillation within an allowable level are automatically selected.

CITATION LIST

Patent Literature

[PTL 1] Japanese Unexamined Patent Application Publication No. 2010-84523

SUMMARY OF INVENTION

Technical Problem

However, at the time of a trial run of the gas turbine or at the time of restarting operation after the completion of regular inspection, due to a difference in combustor structure, a difference in fuel property, a difference in atmospheric condition, or the like, in the method disclosed in PTL 1, there is a case where it is not possible to transition to a normal combustion controlled state. In particular, depending on a fuel-air ratio, an allowable range of an operating condition capable of suppressing combustion oscillation within an allowable level is narrow, and there is a case where it takes a long time to start up until rated operation is reached. Therefore, it is important to confirm in advance an allowable range of the operating condition with respect to the fuel-air ratio before starting a trial run.

In order to solve the above-mentioned problem, the present disclosure has an object to provide a combustion adjustment method and a combustion control device for confirming a combustion tolerance range with respect to a fuel-air ratio of a combustor, as pre-work when starting a trial run of a gas turbine or when restarting operation after the completion of regular inspection.

Solution to Problem

In order to solve the above-mentioned problem, a combustion adjustment method of a gas turbine according to the present disclosure is a combustion adjustment method that is used for combustion control of a combustor, the method including: a step of selecting a combustion parameter for setting a fuel-air ratio with respect to a load of the gas turbine; a step of executing a first step that includes a first increase command step, which is an increase command step of increasing a command value of the combustion parameter, or a first decrease command step, which is a decrease command step of decreasing the command value, from a position of an origin; a step of ending the first step and returning the command value of the combustion parameter to the position of the origin, when the command value reaches a target tolerance upper limit value or a target tolerance lower limit value without occurrence of combustion oscillation in the combustor; a step of executing a second step that includes a second decrease command step, which is a decrease command step of decreasing the command value in a direction opposite to that in the first step from the position of the origin, or a second increase command step, which is an increase command step of increasing the command value; and a step of ending the second step and returning the command value of the combustion parameter in the second step to the position of the origin, when the command value in the second step reaches the target tolerance lower limit value or the target tolerance upper limit value without occurrence of combustion oscillation in the combustor, in which the method further includes a combustion tolerance confirmation step of confirming a combustion tolerance range of the combustion parameter.

Advantageous Effects of Invention

According to the combustion tolerance confirmation method of the present disclosure, the combustion tolerance confirmation work is made efficient regardless of the skill of a worker, and the combustion adjustment work is facilitated. Further, the reliability of the gas turbine is improved.

DESCRIPTION OF EMBODIMENTS

Hereinafter, embodiments of the present disclosure will be described based on the drawings.

Apparatus Configuration

Figure 1:
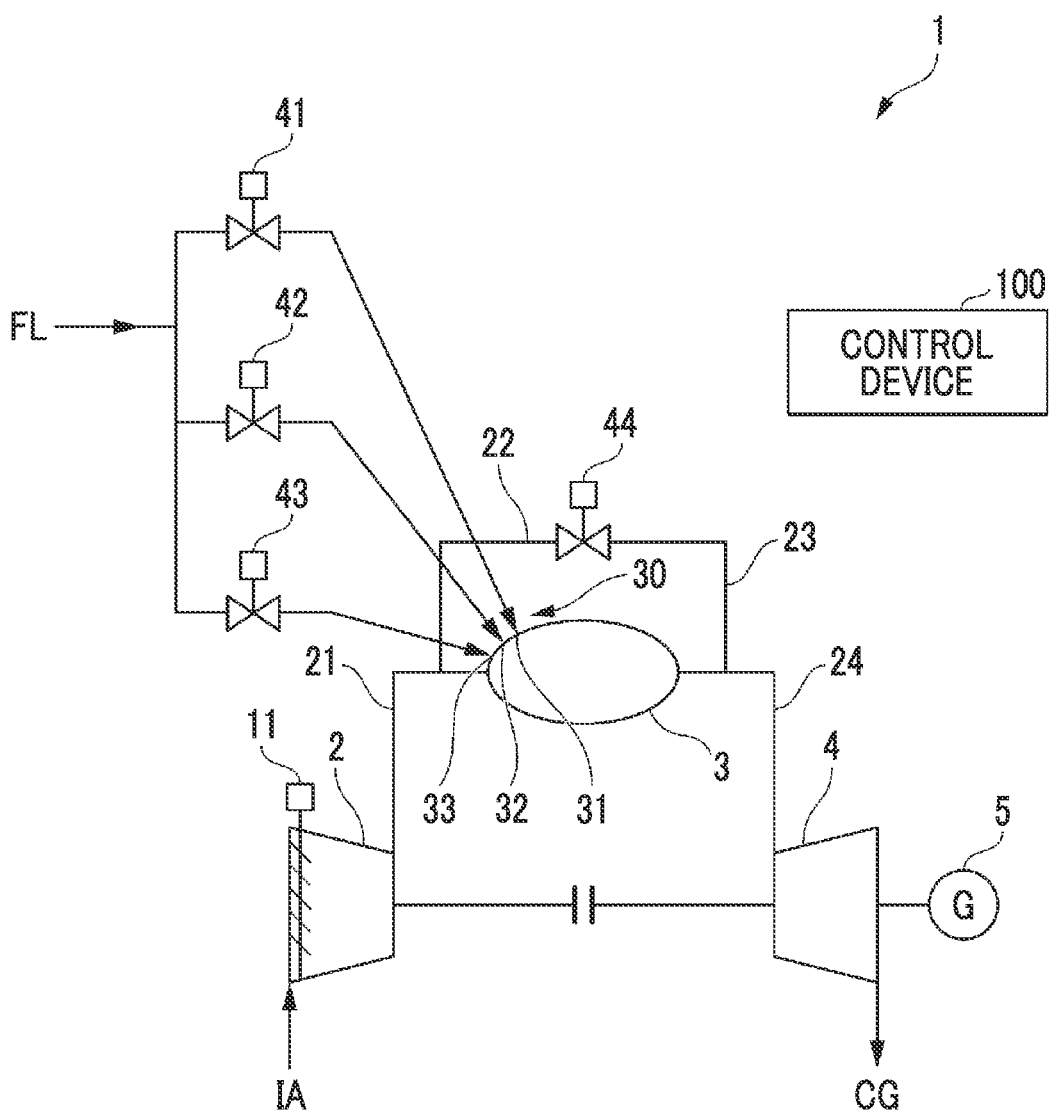
FIG. 1 is a diagram schematically showing an apparatus configuration of a gas turbine.

A schematic apparatus configuration of a gas turbine is shown in FIG. 1. A gas turbine 1 includes a compressor 2 that is provided with an inlet guide vane 11, takes in atmospheric air from the outside, and generates compressed air, a combustor 3 that burns the generated compressed air and separately supplied fuel FL to generate a combustion gas FG, a turbine 4 that is rotationally driven by the generated combustion gas FG, an electric generator 5 that is connected to the turbine 4 and rotationally driven to generate electric power, and a combustion control device 100 that controls the gas turbine 1.

Each combustor 3 is provided with a combustion nozzle 30 that includes a main nozzle 31, a top hat nozzle 32, and a pilot nozzle 33. The main nozzles 31 are annularly arranged around the pilot nozzle 33. Further, the combustor 3 includes a bypass valve 44 and a transition piece 24. The combustor 3 further includes a main fuel flow rate control valve 41, a top hat fuel flow rate control valve 42, and a pilot fuel flow rate control valve 43. Fuel for the main combustion nozzle of the fuel FL that is supplied to the combustor 3 is supplied to the main nozzle 31 through the main fuel flow rate control valve 41. Top hat fuel is supplied to the top hat nozzle 32 through the top hat fuel flow rate control valve 42, and pilot fuel is supplied to the pilot nozzle 33 through the pilot fuel flow rate control valve 43. The flow rate of each of the main fuel, the top hat fuel, and the pilot fuel is controlled by each of the main fuel flow rate control valve 41, the top hat fuel flow rate control valve 42, and the pilot fuel flow rate control valve 43. The combustion gas FG generated in the combustor 3 is supplied to the turbine 4 through the transition piece 24 to rotationally drive the turbine 4.

<<Combustion Control Device>>

Figure 2:
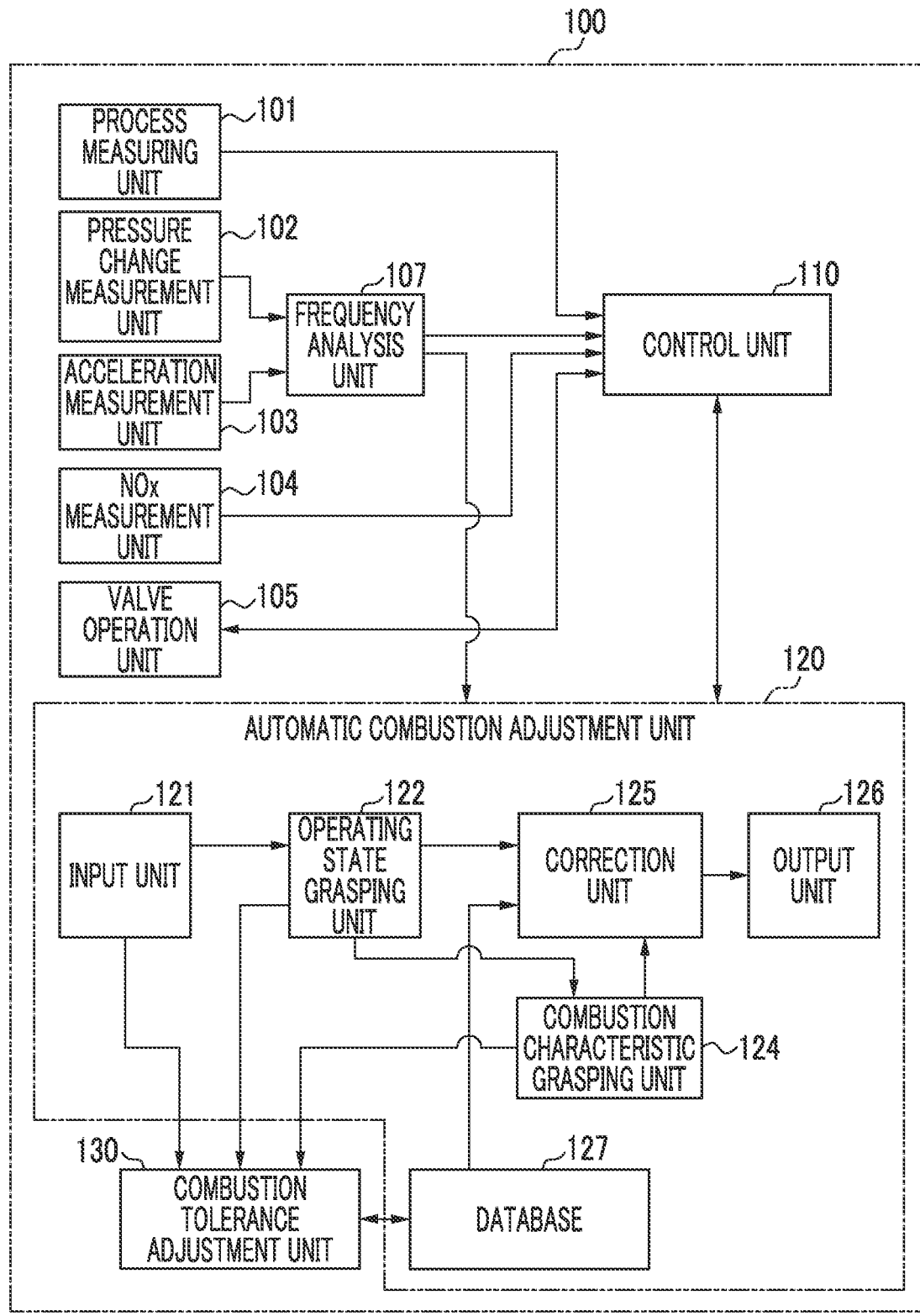
FIG. 2 is a diagram showing a configuration of a combustion control device.

FIG. 2 shows a schematic configuration of the combustion control device 100 of the gas turbine 1 according to the present embodiment. The combustion control device 100 includes a process measuring unit 101, a pressure change measurement unit 102, an acceleration measurement unit 103, a NOx measurement unit 104, a valve operation unit 105, a frequency analysis unit 123, and a control unit 110, which are installed in the gas turbine 1.

The process measuring unit 101 includes various measuring devices that measure process quantities indicating the operating conditions or operating states of the gas turbine 1, and the measurement results are sent to the control unit 110 of the combustion control device 100 at predetermined time intervals. The process quantity means, for example, turbine output, an atmospheric temperature, humidity, fuel flow rate and fuel pressure of each part, air flow rate and air pressure of each part, a combustion gas temperature, combustion gas pressure, rotation speeds of the compressor 2 and the turbine 4, concentration of wastes such as nitrogen oxide (NOx) and carbon monoxide (CO) in an exhaust gas that is discharged from the turbine 4, or the like.

The pressure change measurement unit 102 is a pressure measuring device disposed in each of a plurality of combustors 3, and periodically outputs a pressure change measurement value in each combustor 3 to the control unit 110 according to a command from the control unit 110. The acceleration measurement unit 103 is an acceleration measuring device installed in each combustor 3, periodically measures acceleration according to a command from the control unit 110, and outputs the measured value to the control unit 110. The NOx measurement unit 104 is a device for measuring NOx in the exhaust gas from the combustor 3, periodically measures NOx according to a command from the control unit 110, and outputs the measured value to the control unit 110.

The valve operation unit 105 is a mechanism for operating the opening degree of each of the main fuel flow rate control valve 41, the top hat fuel flow rate control valve 42, the pilot fuel flow rate control valve 43, and the bypass valve 44, the opening degree of the inlet guide vane 11 of the compressor 2, or the like according to a command from the control unit 110. The valve operation unit 105 performs main fuel control, top hat fuel control, pilot fuel control, flow rate control of an air flow rate that is supplied to each combustor 3, flow rate control of atmospheric air that is supplied to the compressor 2, or the like.

The frequency analysis unit 123 performs frequency analysis on pressure fluctuations and on acceleration fluctuations detected by the pressure change measurement unit 102 and by the acceleration measurement unit 103, and outputs the results to the control unit 110.

The combustion control device 100 includes an automatic combustion adjustment unit 120 and a combustion tolerance adjustment unit 130, in addition to the various measuring units and measurement units, the valve operation unit, and the control unit 110 described above. The control unit 110 receives output signals from the process measuring unit 101, the pressure change measurement unit 102, the acceleration measurement unit 103, and the frequency analysis unit 123 and transmits the signals to the automatic combustion adjustment unit 120. Further, the control unit 110 outputs signals for operating the valve opening degrees of the main fuel flow rate control valve 41, the top hat fuel flow rate control valve 42, the pilot fuel flow rate control valve 43, the bypass valve 44, the inlet guide vane 11 of the compressor 2, and the like to the valve operation unit 105.

<<Automatic Combustion Adjustment Unit>>

The automatic combustion adjustment unit 120 shown in FIG. 2 is configured to include an input unit 121, an operating state ascertaining unit 122, a combustion characteristic ascertaining unit 124, a correction unit 125, and an output unit 126. The automatic combustion adjustment unit 120 performs control to select each process quantity in the most effective way of suppressing combustion oscillation when the combustion oscillation occurs in the combustor 3.

The automatic combustion adjustment unit 120 receives the process quantities, pressure, acceleration data, or the like of each part transmitted from the control unit 110 through the input unit 121. Further, the operating state ascertaining unit 122 ascertains the operating state of the gas turbine 1 from the frequency analysis result in the gas turbine 1 by the frequency analysis unit 123, and the combustion characteristic ascertaining unit 124 ascertains the combustion characteristic of each combustor 3. The correction unit 125 determines a control method for preventing the occurrence of combustion oscillation of the gas turbine 1, based on the data ascertained by the operating state ascertaining unit 122 and by the combustion characteristic ascertaining unit 124. For example, it is determined whether or not it is necessary to adjust the valve opening degree of each of the main fuel flow rate control valve 41, the top hat fuel flow rate control valve 42, the pilot fuel flow rate control valve 43, the bypass valve 44, and the inlet guide vane 11 of the compressor 2. In a case where it is necessary to adjust the valve opening degree, the amount of adjustment is determined and output to the control unit 110 through the output unit 126.

<<Combustion Tolerance Adjustment Unit>>

The combustion tolerance adjustment unit 130 ascertains in advance a region in which combustion oscillation does not occur, transmits the data to the automatic combustion adjustment unit 120, and accumulates the data in a database 127 in the automatic combustion adjustment unit 120, before starting a trial run of the gas turbine with a small amount of accumulated data on past operating conditions. The combustion tolerance adjustment unit 130 has a purpose to prepare operating conditions that allow transition to rated operation without the occurrence of combustion oscillation, by utilizing the data of the automatic combustion adjustment unit 120 that reflects the accumulated data, and to realize a state in which the gas turbine can transition to the rated operation in a short period of time, at the time of a trial run of the gas turbine 1 or at the time of start-up after the completion of regular inspection.

Therefore, at the time of the start of a trial run or when restarting operation after the completion of regular inspection, combustion adjustment work such as the confirmation of a tolerance range of combustion oscillation, which has been performed by a combustion adjustment worker in the related art, is automated using the combustion tolerance adjustment unit 130, and the combustion adjustment work is optimized.

Figure 3:
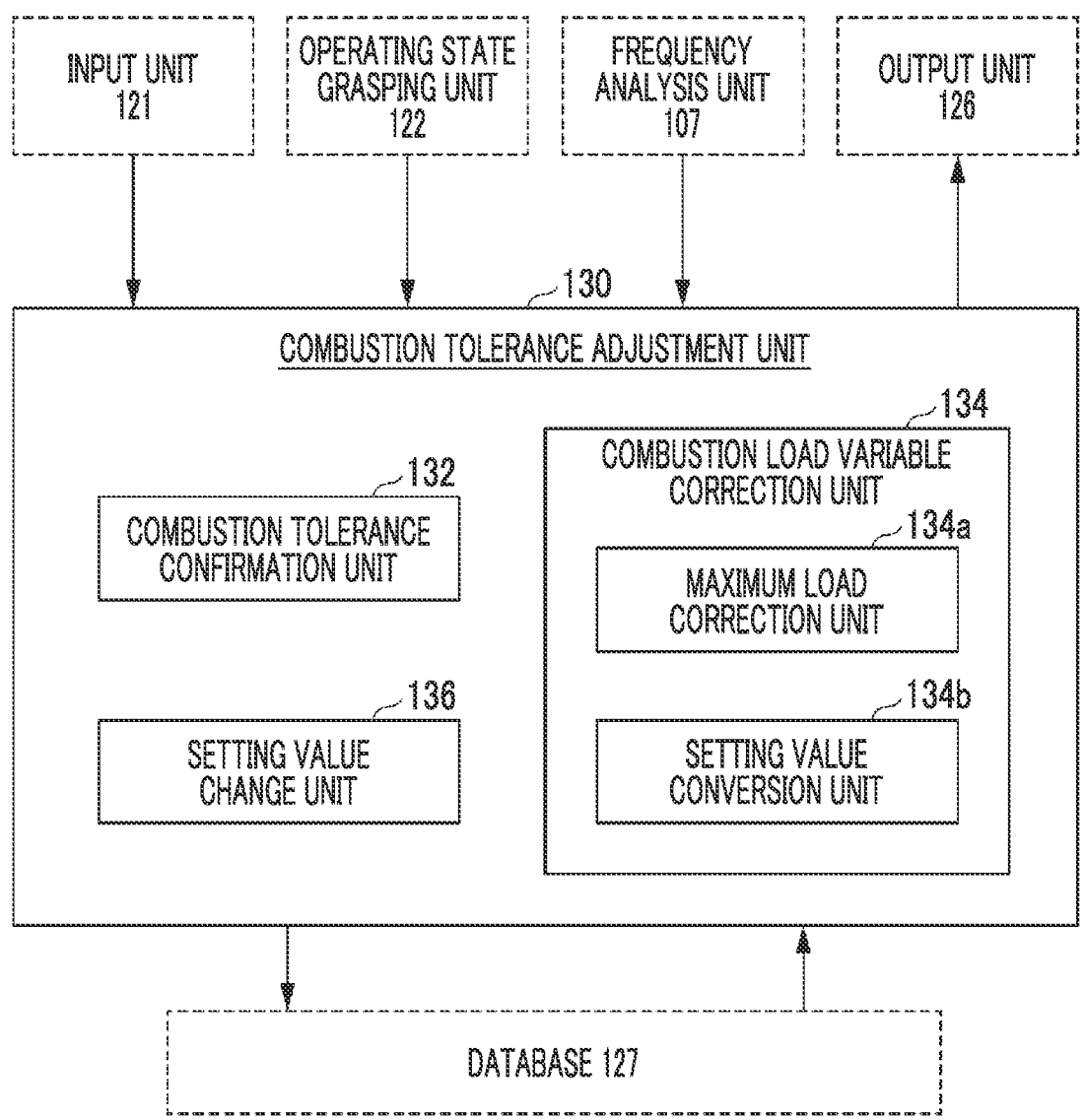
FIG. 3 is a diagram showing a configuration of a combustion tolerance confirmation unit.

As shown in FIG. 3, the combustion tolerance adjustment unit 130 includes a combustion tolerance confirmation unit 132, a combustion load variable correction unit 134, and a setting value change unit 136. The combustion load variable correction unit 134 includes a maximum load correction unit 134a and a setting value conversion unit 134b.

In the combustion tolerance confirmation unit 132, before starting a trial run of the gas turbine 1 or before restarting operation after the completion of regular inspection, combustion tolerance confirmation based on various combustion tolerance patterns along the flow of a combustion tolerance confirmation step S20 (FIGS. 8 and 9), which will be described later, is performed on each combustion parameter PM, and the combustion tolerance range of combustion oscillation occurring in the combustor 3 is confirmed in advance to be acquired as steady data 128, and various operation data at the start of operation of the gas turbine 1 is accumulated.

The combustion load variable correction unit 134 has a purpose to optimize the relationship between the combustion parameter PM and a combustion load variable CLP while maintaining the relationship between a gas turbine inlet temperature GTIT and the combustion parameter PM such that the gas turbine 1 outputs planned maximum output MOP of the gas turbine 1 at a rated value (100%) of the combustion load variable CLP. As described in detail later, the maximum load correction unit 134a corrects the combustion load variable CLP such that the combustion load variable CLP becomes the rated value (100%) at the planned maximum output MOP. The setting value conversion unit 134b converts a setting value that determines the relationship between the gas turbine inlet temperature GTIT and the combustion load variable CLP such that the relationship between the gas turbine inlet temperature GTIT and the combustion parameter PM is maintained, based on the combustion load variable CLP after correction. The combustion load variable correction unit 134 is provided, so that the occurrence of combustion oscillation in the combustor 3 is suppressed while the relationship between the gas turbine inlet temperature GTIT and the combustion parameter PM is maintained, and stable operation of the gas turbine 1 becomes possible. In the following description, there is also a case where a gas turbine load (gas turbine output) is simply expressed as a GT load (GT output).

The setting value change unit 136 has a purpose to automatically change the setting value of the combustion load variable CLP before correction to the setting value after correction because a setting value indicating the relationship between the combustion parameter PM and the combustion load variable CLP is changed in a case where combustion oscillation occurs and origin movement (origin shift), which will be described later, occurs in the combustion tolerance confirmation step S20. The setting value change is automated, so that the burden on an operation adjustment worker is reduced and safety is improved.

The main work in the combustion tolerance adjustment unit 130 is to suppress combustion oscillation occurring in the combustor 3 within an allowable level with respect to each combustion parameter PM in the combustion tolerance adjustment unit 130, and to confirm a combustion tolerance range in which combustion oscillation does not occur. The combustion tolerance range is defined as an origin OP by defining the position or numerical value of the combustion parameter PM with respect to the combustion load variable CLP as a reference operating point. The presence or absence of the occurrence of combustion oscillation at operating points with different GT loads is confirmed with the origin OP as a reference, and a stable operating range in which combustion oscillation does not occur is determined. With respect to the gas turbine load, for convenience, the planned maximum load MOP of the gas turbine 1 or the combustion load variable CLP at a rated load is set to be the rated value (100%), and the combustion load variable CLP of no-load equivalent output NOP of the gas turbine is set to be 0 (zero) %. Any gas turbine load is expressed by the combustion load variable CLP. The combustion parameter PM with respect to any gas turbine load can be expressed as a setting value of the corresponding combustion load variable CLP.

<<Combustion Tolerance Confirmation Method>>

Next, the concept of a combustion tolerance confirmation method and a combustion tolerance pattern common to each combustion parameter PM will be described. In the following description, the combustion tolerance range confirmation means the confirmation of a range and width in which combustion oscillation does not occur in the combustor 3 with respect to each combustion parameter PM. However, there is also a case where it is simply expressed as combustion tolerance confirmation. The word "combustion oscillation does not occur" means a state where combustion oscillation in the combustor 3 is suppressed within an allowable level, and the word "combustion oscillation occurs" means a state where combustion oscillation exceeds an allowable level.

The combustion parameters PM for which the combustion tolerance range is confirmed are a pilot ratio PL, a top hat ratio TH, and a bypass valve opening degree BV. The pilot ratio PL is expressed as a percentage (%) of a distribution ratio of the fuel that is supplied to the pilot nozzle 33 to the total fuel flow rate FL. The top hat ratio TH is expressed as a percentage (%) of a distribution ratio of the fuel that is supplied to the top hat nozzle 32 to the total fuel flow rate FL. The bypass valve opening degree BV is expressed as a percentage (%) of the valve opening degree BV to the full opening of the bypass valve 44. The presence or absence of the occurrence of combustion oscillation in the combustor 3 depends on setting values ST of the pilot ratio PL, the top hat ratio TH, and the bypass valve opening degree BV with respect to a predetermined GT load. Other parameters that affect the combustion state of the combustor 3 may be selected as the combustion parameters PM.

<<Priority Ranking of Combustion Parameters>>

In the combustion tolerance adjustment unit 130, the combustion tolerance confirmation step S20 (FIGS. 8 and 9) of confirming a combustion tolerance range, which will be described later, is executed with respect to all the combustion parameters PM described above. As for the priority ranking of the combustion parameters PM, it is desirable to preferentially execute the combustion tolerance confirmation step S20 for the combustion parameter PM, in which combustion oscillation easily occurs, in order to end the confirmation of the combustion tolerance range in a short period of time. The range in which combustion oscillation does not occur means that the level of combustion oscillation with respect to the combustion load variable CLP is within an allowable level, and means the range of the GT load between the operating point of an upper limit GT load within an allowable level and the operating point of a lower limit GT load. For example, in a case where combustion oscillation occurs during the execution of the combustion tolerance confirmation step S20 with respect to the pilot ratio PL after the combustion tolerance confirmation step S20 has ended with respect to the top hat ratio TH as the combustion parameter PM, it is necessary to perform the combustion tolerance confirmation step S20 again with respect to the top hat ratio TH. That is, the combustion tolerance confirmation step S20 is repeated, so that it takes a long time to confirm the combustion tolerance range of the combustion parameter PM. Therefore, at the time of a trial run of the gas turbine 1 or at the time of starting operation after the completion of regular inspection, the selection of the priority ranking of the combustion parameters PM affects a trial run step at the time of start-up of the gas turbine, so that careful selection is required.

<<Relationship with Gas Turbine Load>>

Since the frequency band and occurrence position of combustion oscillation that occurs in the combustor 3 differ depending on the GT load, the GT load at the time of the combustion tolerance confirmation work is selected in a range from 0% to the rated value (100%). The rated value (100%) of the GT load means the planned maximum load (planned maximum output) or the rated load (rated output) of the gas turbine.

<<Increase Command Step and Decrease Command Step>>

Several change patterns and the degrees of priority for the purpose to confirm the combustion tolerance range of each combustion parameter in the combustion tolerance confirmation step S20 will be described below.

Figure 4:
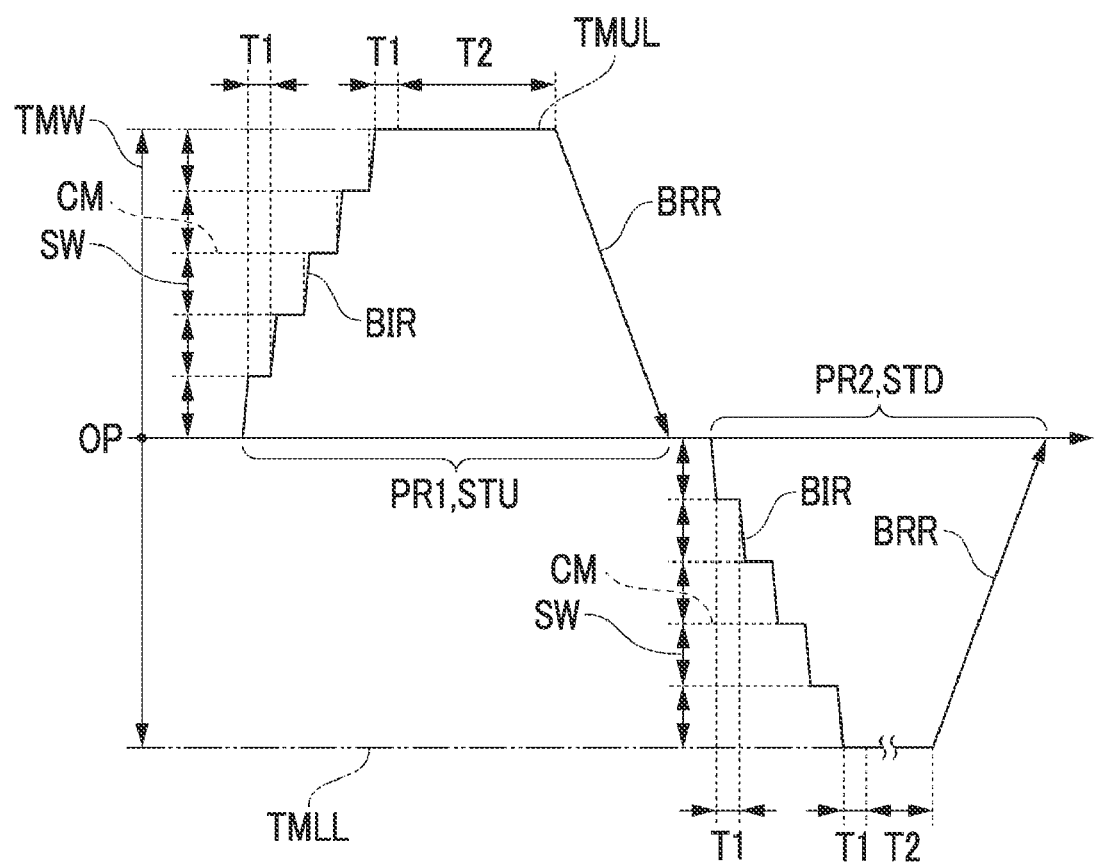
FIG. 4 is a diagram showing a first combustion tolerance confirmation pattern.

An example of the combustion tolerance confirmation pattern is shown in FIG. 4. In the combustion tolerance confirmation step S20, in both steps of an increase command step STU in a direction of increasing a command value CM indicating the output of the combustion parameter PM and a decrease command step STD in a direction of decreasing the command value CM, it is necessary to confirm the presence or absence of the occurrence of combustion oscillation. After the confirmation of the combustion tolerance ranges in both steps has ended, the presence or absence of the occurrence of combustion oscillation at a predetermined GT load and the combustion tolerance width are confirmed. Whether to give priority to the increase command step STU or to the decrease command step STD at a predetermined GT load depends on the combustion parameter PM. After each of the increase command step STU and the decrease command step STD has ended, the steady data 128 in each step is collected. In the combustion tolerance confirmation step S20, when the two steps of the increase command step STU and the decrease command step STD have ended, one cycle work for the tolerance confirmation of the combustion parameter PM that is a target is ended. The selection of whether the increase command step STU is selected in a first step PR1 of the first half and the decrease command step STD is selected in a second step of the second half or of whether the reverse order is adopted is determined according to the combustor characteristic or the combustion state.

Further, at the time of initial setting when restarting operation after the completion of a trial run or regular inspection, a target tolerance width TMW for executing the confirmation of the combustion tolerance range is determined. The target tolerance width TMW is shown by the difference between a target tolerance upper limit value TMUL that determines the upper limit of the command value CM in the increase command step STU and a target tolerance lower limit value TMLL that determines the lower limit of the command value CM in the decrease command step STD. Essentially, it is desirable that the target tolerance upper limit value TMUL and the target tolerance lower limit value TMLL are selected to be located at positions of the same width from the position of the origin OP, which serves as the reference of the output for confirming the combustion tolerance. Further, the command value CM in the increase command step STU and in the decrease command step STD may be selected by increasing or decreasing the command value CM in one direction at a constant rate, or the command value CM may be increased or decreased along a stepped stage S, as shown in FIG. 4. Which method is selected depends on the characteristic of the combustor or on the operating state of the gas turbine. Further, it is desirable to perform the combustion tolerance range confirmation with a stage width SW set to be the same width and with the number of stages S in the increase command step STU or in the decrease command step STD from the origin OP to the target tolerance upper limit value TMUL or to the target tolerance lower limit value TMLL set to be the same. In the increase command step STU, the selection of the command value CM is performed in a direction in which the command value CM increases in a (+) direction from the position of the origin OP with the position of the origin OP set to be zero (%). On the other hand, in the decrease command step STD, the selection of the command value CM is performed in a direction in which the command value CM decreases in a (−) direction from the position of the origin OP with the position of the origin OP set to be zero (%). It is desirable that the target tolerance width TMW is variable within a range that does not adversely affect the apparatus.

Specific examples of the combustion tolerance confirmation pattern of the combustion parameter PM will be described below.

Figure 5:
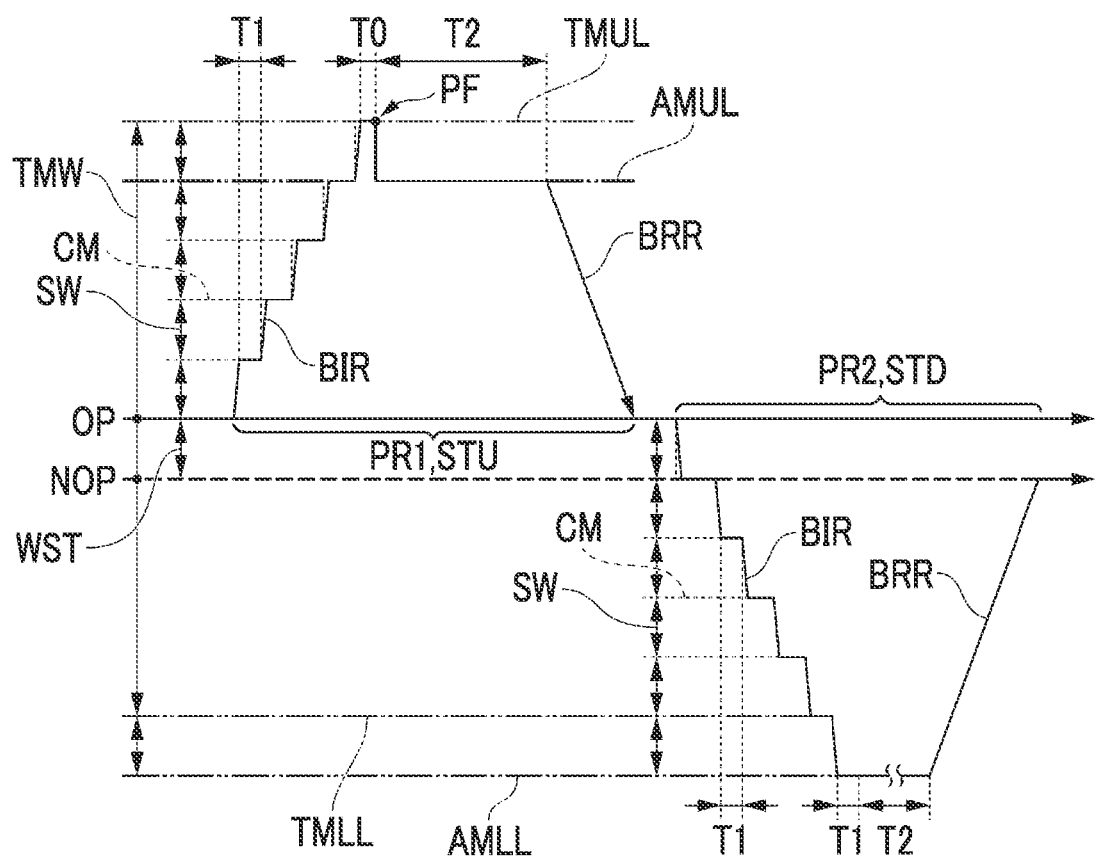
FIG. 5 is a diagram showing a second combustion tolerance confirmation pattern.
Figure 6:
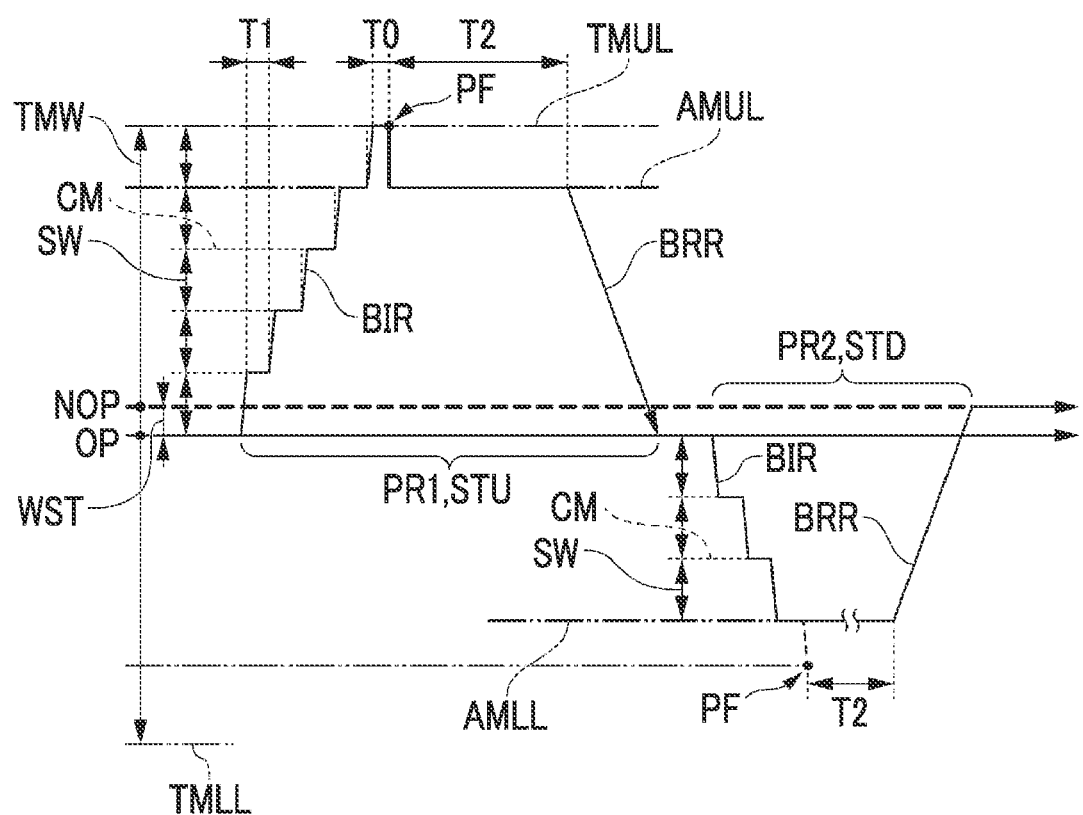
FIG. 6 is a diagram showing a third combustion tolerance confirmation pattern.
Figure 7:
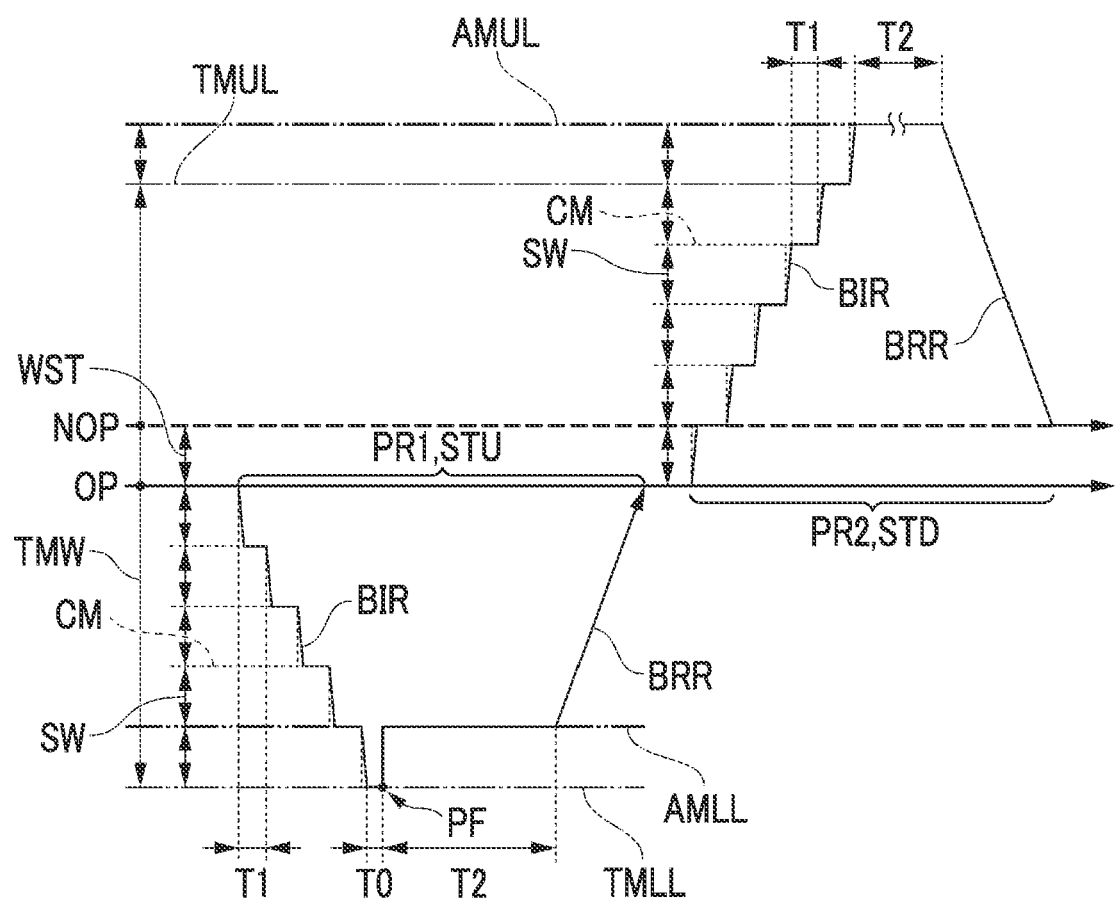
FIG. 7 is a diagram showing a fourth combustion tolerance confirmation pattern.

FIG. 4 is an example of a first combustion tolerance confirmation pattern. An example is shown in which with respect to one combustion parameter PM at a predetermined GT load, the command value CM of the combustion parameter PM is within the range of the target tolerance upper limit value TMUL or the target tolerance lower limit value TMLL, and combustion oscillation is suppressed within an allowable level, so that the combustion tolerance confirmation step is ended. FIG. 5 is an example of a second combustion tolerance confirmation pattern. Similarly, the second combustion tolerance confirmation pattern is an example in which in the increase command step STU, combustion oscillation occurs to exceed an allowable level before the command value CM of the combustion parameter PM reaches the target tolerance upper limit value TMUL. FIG. 6 is an example of a third combustion tolerance confirmation pattern. Similarly, the third combustion tolerance confirmation pattern is an example in which in the increase command step STU and in the decrease command step STD, combustion oscillation occurs to exceed an allowable level before the command value CM of the combustion parameter reaches the target tolerance upper limit value TMUL and the target tolerance lower limit value TMLL. FIG. 7 is an example of a fourth combustion tolerance confirmation pattern. The fourth combustion tolerance confirmation pattern is a modification example of the second combustion tolerance confirmation pattern shown in FIG. 5, and in this example, in the decrease command step STD, combustion oscillation occurs before the command value CM of the combustion parameter PM reaches the target tolerance lower limit value TMUL.

<<First Combustion Tolerance Confirmation Pattern>>

In the first combustion tolerance confirmation pattern shown in FIG. 4, combustion oscillation is suppressed within an allowable level up to the target tolerance upper limit value TMUL in the increase command step STU of the first step PR1, and thus it can be confirmed that combustion oscillation does not occur. Further, in the decrease command step STD of a next second step PR2 as well, combustion oscillation is suppressed within an allowable level up to the target tolerance lower limit value TMLL, and thus it is confirmed that combustion oscillation does not occur, and an embodiment is shown in which the command value CM is returned to the position of the origin OP, and the combustion tolerance range of one cycle at a predetermined GT load and at a predetermined origin OP can be confirmed. Here, the expression "combustion oscillation is suppressed within an allowable level" means a state where at a predetermined setting value ST, combustion oscillation is suppressed within an allowable level until a certain retention time elapses.

The first combustion tolerance confirmation pattern will be specifically described with reference to FIG. 4. The first combustion tolerance confirmation pattern shows an example in which as the first step PR1, priority is given to the increase command step STU, and after the increase command step STU has ended, the decrease command step STD of the second step PR2 is executed. In the increase command step STU of the first step PR1, the command value CM is set by adding a predetermined command value input rate BIR with the origin OP at the time of initial setting as a starting point. After the command value CM reaches a predetermined new command value CM, a predetermined retention time T1 is held, and the presence or absence of the occurrence of combustion oscillation is confirmed. After it is confirmed that combustion oscillation does not occur, a new command value CM of the next stage S is set by adding a predetermined command value input rate BIR to the command value CM. After the command value CM reaches the new command value CM of the next stage S, a predetermined retention time T1 is held, and the presence or absence of the occurrence of combustion oscillation is confirmed. This procedure is repeated with the stage width SW of the same fixed width, the command value CM reaches the target tolerance upper limit value TMUL, a predetermined retention time T1 is held, and the presence or absence of the occurrence of combustion oscillation is confirmed. In a case where combustion oscillation does not occur even after the predetermined retention time T1 has elapsed, it is determined that the combustion tolerance range with respect to the origin OP at the time of initial setting in the increase command step STU has been confirmed. After the combustion tolerance range with respect to the origin OP at the time of initial setting is confirmed, the command value CM reaches the target tolerance upper limit value TMUL, a predetermined retention time T2 is held from the time when the retention time T1 has elapsed, and the steady data 128 of the gas turbine 1 is collected. After the steady data 128 is collected, it is determined that the first step PR1 has ended, and the command value CM is returned to the position of the origin OP at the time of initial setting at a predetermined command value cancellation rate BRR at the time of return to the origin. The command value CM is set by adding a predetermined bias to the current command value CM in which the retention time T1 (first retention time) is maintained without the occurrence of combustion oscillation. As the retention time T1 (first retention time), a different time may be selected according to the characteristic of the combustor or to the operating state of the gas turbine.

Next, in the second step PR2, the combustion tolerance range of the decrease command step STD in a direction opposite to that in the increase command step STU with the origin OP as a starting point is confirmed. In the decrease command step STD, a new command value CM is set by subtracting a predetermined command value input rate BIR from the origin OP. After the command value CM reaches a predetermined new command value CM, a predetermined retention time T1 is held, and the presence or absence of the occurrence of combustion oscillation is confirmed. After it is confirmed that combustion oscillation does not occur, a new command value CM of the next stage S is set by subtracting a predetermined command value input rate BIR from the command value CM. After the command value CM reaches the next new command value CM, a predetermined retention time T1 is held at the next new command value CM, and the presence or absence of the occurrence of combustion oscillation is confirmed. This procedure is repeated with the stage width SW of the same fixed width, the command value CM reaches the target tolerance lower limit value TMLL, a predetermined retention time T1 is held, and the presence or absence of the occurrence of combustion oscillation is confirmed. In a case where combustion oscillation does not occur even after the predetermined retention time T1 has elapsed, it is determined that the combustion tolerance range with respect to the origin OP at the time of initial setting in the decrease command step STD has been confirmed. The command value CM reaches the target tolerance lower limit value TMLL, a predetermined retention time T2 (second retention time) is held from the time when the retention time T1 has elapsed, and the steady data 128 of the gas turbine 1 is collected. After the steady data 128 is collected, it is determined that the second step PR2 has ended, and the command value CM is returned to the position of the original origin OP at a predetermined command value cancellation rate BRR at the time of return to the origin, and confirmation work of one cycle of the combustion tolerance range at a predetermined GT load and at a predetermined origin OP of the first combustion tolerance confirmation pattern is ended. The collected steady data 128 of the gas turbine 1 is sent to the database 127. The command value input rate BIR may be a stepped constant fixed value, or may be a slant rate with a constant slope.

<<Second Combustion Tolerance Confirmation Pattern>>

Unlike the first combustion tolerance confirmation pattern shown in FIG. 4, the second combustion tolerance confirmation pattern shown in FIG. 5 shows an example in a case where the combustion tolerance range cannot be confirmed at the target tolerance upper limit value TMUL in the increase command step STU of the first step PR1. That is, a case is shown in which in the increase command step STU, combustion oscillation occurs before the retention time T1 elapses after the command value CM reaches the target tolerance upper limit value TMUL. In a case where at the command value CM that is the target tolerance upper limit value TMUL, the retention time T1 cannot be maintained and combustion oscillation occurs, the command value CM of the stage S that is one stage lower immediately before the stage S in which combustion oscillation has occurred is set as an actual tolerance upper limit value AMUL of the increase command step STU.

The second combustion tolerance confirmation pattern shown in FIG. 5 is an example in which the increase command step STU is preferentially executed as the first step PR1, and after the increase command step STU has ended, the decrease command step STD, which is the second step PR2, is executed. In the increase command step STU, similar to the first combustion tolerance confirmation pattern, a new command value CM is set by adding a predetermined setting value input rate BIR with the origin OP at the time of initial setting as a starting point. After the command value CM reaches a predetermined new command value CM, a predetermined retention time T1 is held, and the presence or absence of the occurrence of combustion oscillation is confirmed. After it is confirmed that combustion oscillation does not occur, a predetermined command value input rate BIR is added to the command value CM, and the presence or absence of the occurrence of combustion oscillation is confirmed at the new command value CM of the next stage S. The method of repeating this procedure is the same as that in the first combustion tolerance confirmation pattern.

However, in the case of the second combustion tolerance confirmation pattern shown in FIG. 5, an example is shown in which after the command value CM reaches the target tolerance upper limit value TMUL, combustion oscillation occurs at an unreached time TO shorter than the retention time T1. In this manner, in a case where combustion oscillation occurs before the target tolerance upper limit value TMUL is reached and the combustion tolerance range cannot be confirmed, the command value CM in the stage S that is one stage lower immediately before the stage S in which combustion oscillation has occurred is determined as the actual tolerance upper limit value AMUL, and is used as the upper limit value of the command value CM in the increase command step STU. In this case, the increase command step STU of the first step PR1 is ended at the point in time when combustion oscillation has occurred. That is, in the increase command step STU, as a target combustion tolerance range to be originally confirmed, the command value CM confirms a combustion tolerance range without the occurrence of combustion oscillation at the target tolerance upper limit value TMUL. However, in the example shown in FIG. 5, since combustion oscillation occurs in the increase command step STU, the increase command step STU is ended in a state of one stage short. In this case, the command value CM is returned to the command value CM that is the stage S immediately before the combustion tolerance range has been confirmed without the occurrence of combustion oscillation, and this command value CM is set as the actual tolerance upper limit value AMUL. The retention time T2 is maintained from a point in time PF when combustion oscillation has occurred at this command value CM, and the steady data 128 of the gas turbine 1 is collected. The collected steady data 128 is sent to the database 127. Here, it is determined that the first step PR1 has ended, and the command value CM is returned to the origin OP.

Next, as described above, in the increase command step STU of the first step PR1, the number of original target stages S is one stage short, and therefore, in the decrease command step STD, the combustion tolerance confirmation step S20 is executed with the number of stages that is one stage larger than the number of stages in the decrease command step STD, which is an original target. As described above, since it is premised that the target tolerance width TMW at the time of initial setting is maintained, it is desirable to maintain the total number of stages or the target tolerance width TMW between the target tolerance upper limit value TMUL and the target tolerance lower limit value TMLL at the time of initial setting. Therefore, as shown in FIG. 5, in the decrease command step STD of the second combustion tolerance confirmation pattern, the combustion tolerance confirmation is executed with the command value CM further decreased by one stage in the direction of decreasing the command value CM with respect to the target tolerance lower limit value TMLL at the time of initial setting. In a case where the retention time T1 is maintained without the occurrence of combustion oscillation at the command value CM that is one stage lower than the target tolerance lower limit value TMLL, it is determined that the combustion tolerance range at this command value CM has been confirmed, and the command value CM is set as an actual tolerance lower limit value AMLL. A specific procedure for confirming the combustion tolerance range in the decrease command step STD of the second combustion tolerance confirmation pattern is the same as that is the decrease command step STD of the first combustion tolerance confirmation pattern except for a difference in the number of stages. After the retention time T1 is maintained without the occurrence of combustion oscillation at the actual tolerance lower limit value AMLL, it is determined that the combustion tolerance range at this command value CM has been confirmed, the command value CM reaches the actual tolerance lower limit value AMLL, the retention time T2 is maintained from the time when the retention time T1 has elapsed, and the steady data 128 of the gas turbine 1 in the increase command step STU is collected. In this way, it is determined that the second step has ended.

The second combustion tolerance confirmation pattern is different from the first combustion tolerance confirmation pattern in that the number of stages differs between the increase command step STU and the decrease command step STD. That is, as described above, it is desirable to set the number of stages to be the same in the increase command step STU and in the decrease command step STD with the origin OP as the center. Therefore, it is desirable that the position of the origin OP in the second combustion tolerance confirmation pattern is set to be an intermediate position (midpoint position) between the actual tolerance upper limit value AMUL of the increase command step STU and the actual tolerance lower limit value AMLL of the decrease command step STD. Therefore, the position of the origin OP after the confirmation of the combustion tolerance range is moved to the position of the command value CM, which is one stage lower than the position of the origin OP at the time of initial setting in the direction of decreasing the command value, and this position is set as a new origin NOP. After the collection of the steady data 128 in the decrease command step STD has ended, the second step PR2 is ended, and the command value CM is moved to the position of the new origin NOP at a predetermined cancellation rate BRR at the time return to the origin. In a case where the origin OP has moved to the new origin NOP as a result of the confirmation of the combustion tolerance range, it is determined that the origin shift has occurred.

The second combustion tolerance confirmation pattern shown in FIG. 5 is an embodiment in which in the first step PR1, after the command value CM has reached the target tolerance upper limit value TMUL, the retention time T1 cannot be maintained, and combustion oscillation occurs at the unreached time TO shorter than the retention time T1. In the case of this embodiment, the same is true in a case where combustion oscillation occurs before reaching the target tolerance upper limit value TMUL, which is the command value CM of the next stage S from one stage S lower immediately before the stage S in which combustion oscillation has occurred, and in a process in which the command value CM increases. That is, the command value CM in the stage S in which the combustion tolerance range immediately before combustion oscillation occurs is confirmed is set as the actual tolerance upper limit value AMUL in the increase command step STU. In this case, the procedure for confirming the combustion tolerance range in the decrease command step STD of the second step PR2 is the same as that in the first combustion tolerance confirmation pattern shown in FIG. 4, and it is desirable that the origin OP at the time of initial setting is moved to the new origin NOP. Further, in the increase command step STU of the first step PR1 shown in FIG. 5, even in a case where combustion oscillation occurs at the command value CM that is lower than the target tolerance upper limit value TMUL by two or more stages, the command value CM in the stage S in which the combustion tolerance range is confirmed immediately before the stage S in which combustion oscillation has occurred may be set as the actual tolerance upper limit value AMUL. Further, in the decrease command step STD of the second step PR2, a difference between the number of stages S of the target tolerance upper limit value TMUL and the number of stages of the actual tolerance upper limit value AMUL of the increase command step STU in which combustion oscillation has occurred, that is, the number of unreached stages in which the combustion tolerance range has not been confirmed, is subtracted from the target tolerance lower limit value TMLL of the decrease command step STD, and the new number of stages is further set in the direction of decreasing the command value. The command value CM is decreased in the decrease direction from the target tolerance lower limit value TMLL by the number of unreached stages, based on the new number of stages, and the combustion tolerance confirmation of the decrease command step STD is executed. In the decrease command step STD, in a case where the combustion tolerance range is confirmed without the occurrence of combustion oscillation, the command value CM in the final stage S of the decrease command step STD is set as the actual tolerance lower limit value AMLL. The command value CM, which is an intermediate position (midpoint position) between the actual tolerance upper limit value AMUL and the actual tolerance lower limit value AMLL, is set as the new origin NOP. In this case as well, it is determined that the origin shift has occurred.

<<Third Combustion Tolerance Confirmation Pattern>>

In the third combustion tolerance confirmation pattern shown in FIG. 6, similar to the second combustion tolerance confirmation pattern shown in FIG. 5, priority is given to the increase command step STU in the first step PR1. However, this example is different from the second combustion tolerance confirmation pattern shown in FIG. 5 in that it is an embodiment in which combustion oscillation occurs in both steps of the increase command step STU and the decrease command step STD. Further, the third combustion tolerance confirmation pattern is an aspect that is different from the first combustion tolerance confirmation pattern and the second combustion tolerance confirmation pattern in that it is an aspect in which the total number of stages between the actual tolerance upper limit value AMUL and the actual tolerance lower limit value AMLL does not reach the total number of stages between the target tolerance upper limit value TMUL and the target tolerance lower limit value TMLL at the time of initial setting, and the combustion tolerance range confirmation is ended with the number of unreached stages remaining.

As shown in FIG. 6, in this example, in the increase command step STU, similar to the increase command step STU of the second combustion tolerance confirmation pattern shown in FIG. 5, after the command value CM reaches the target tolerance upper limit value TMUL, combustion oscillation occurs during the unreached time TO, which is shorter than the retention time T1. Therefore, in this example, in the case of this pattern, similar to the second combustion tolerance confirmation pattern shown in FIG. 5, combustion oscillation occurs at the target tolerance upper limit value TMUL, which is an original target, and the increase command step STU is ended with one stage not yet reached without confirming the combustion tolerance range. In this case as well, the command value CM is decreased to the command value CM of the stage S immediately before the combustion oscillation occurs, and the command value CM in this stage S is determined as the actual tolerance upper limit value AMUL. The retention time T2 is maintained from the time when the command value CM has reached the actual tolerance upper limit value AMUL (the point in time PF when combustion oscillation has occurred), the steady data 128 of the gas turbine 1 is collected, it is determined that the first step PR1 has ended, and the command value CM is returned to the position of the origin OP. The collected steady data 128 is sent to the database 127.

In the decrease command step STD, similar to the decrease command step STD of the second combustion tolerance confirmation pattern, from the viewpoint of maintaining the target tolerance width TMW at the time of initial setting, it is desirable that the combustion tolerance confirmation step S20 is executed with the number of stages S that is one stage larger than the number of stages which is an original target, and that the total number of stages between a predetermined target tolerance upper limit value TMUL and a predetermined target tolerance lower limit value TMLL is maintained. Therefore, in the decrease command step STD of the second combustion tolerance confirmation pattern shown in FIG. 5, the combustion tolerance confirmation is executed with the command value CM further decreased by one stage in the direction of decreasing the command value CM from the target tolerance lower limit value TMLL at the time of initial setting.

However, in the decrease command step STD of the third combustion tolerance confirmation pattern shown in FIG. 6, an example is shown in which combustion oscillation occurs at the stage S before the command value CM reaches the target tolerance lower limit value TMLL. Specifically, in this example, the combustion tolerance confirmation is ended in the step from the position of the origin OP to three stages S in the direction of decreasing the setting value ST, and combustion oscillation occurs in the process of decreasing the command value CM toward the next stage S. In this pattern, in the decrease command step STD, originally, in order to satisfy the target tolerance width TMW at the time of initial setting, it is necessary to confirm the combustion tolerance at the command value CM at the position further decreased by one stage in the direction of decreasing the command value CM from the position of the stage S where the command value CM is the target tolerance lower limit value TMLL. However, as described above, in this aspect, it is a pattern in which combustion oscillation occurs at the stage S before reaching the target tolerance lower limit value TMLL, the combustion tolerance cannot be confirmed in the original target range, and in both steps of the increase command step STU of the first step PR1 and the decrease command step STD of the second step PR2, the combustion tolerance confirmation step S20 is ended while remaining a plurality of unreached stages S where the combustion tolerance range cannot be confirmed. In this embodiment, the setting value ST is returned to the command value CM of the stage S immediately before combustion oscillation occurs, and this command value CM is set as the actual tolerance lower limit value AMLL in the decrease command step STD. The retention time T2 is maintained from the point in time of returning to the command value CM that is the actual tolerance lower limit value AMLL (the point in time PF when combustion oscillation has occurred), and after the steady data 128 of the gas turbine 1 is collected, the data is sent to the database 127. In this way, it is determined that the second step PR2 of this pattern has ended.

As shown in FIG. 6, in this embodiment, combustion oscillation occurs in the increase command step STU, the combustion tolerance confirmation step S20 of the increase command step STU is ended with the unreached stage S remaining, and the actual tolerance upper limit value AMUL, which is an upper limit value lower than the target tolerance upper limit value TMUL, is set. Further, combustion oscillation occurs in the decrease command step STD as well, the combustion tolerance confirmation step S20 of the increase command step STU is ended with the unreached stage S remaining, and the actual tolerance lower limit value AMLL, which is a lower limit value lower than the target tolerance lower limit value TMLL, is set. That is, the confirmed combustion tolerance range in this embodiment (the width between the actual tolerance upper limit value AMUL and the actual tolerance lower limit value AMLL) is smaller than the total number of stages of the increase command step STU and of the decrease command step STD at the time of initial setting, and the combustion tolerance confirmation step S20 is ended in a range narrower than the target tolerance width TMW at the time of initial setting. Further, as a result of the confirmation of the combustion tolerance range in this aspect, the origin OP at the time of initial setting is changed to the intermediate position (midpoint position) between the actual tolerance upper limit value AMUL and the actual tolerance lower limit value AMLL. In the third combustion tolerance confirmation pattern, after the steady data 128 of the gas turbine 1 is collected in the decrease command step STD, the command value CM is moved to the position of the new origin NOP at a predetermined cancellation rate BRR at the time of return to the origin. In this case as well, it is determined that the origin shift has occurred.

<<Fourth Combustion Tolerance Confirmation Pattern>>

The fourth combustion tolerance confirmation pattern shown in FIG. 7 is a modification example of the second combustion tolerance confirmation pattern shown in FIG. 5, in which the first step PR1 and the second step PR2 are interchanged. That is, the fourth combustion tolerance confirmation pattern shown in FIG. 7 is slightly different from the second combustion tolerance confirmation pattern shown in FIG. 5 in that in the first step PR1, the decrease command step STD is executed in priority to the increase command step STU. In the present embodiment showing the fourth combustion tolerance confirmation pattern, combustion oscillation occurs in the decrease command step STD, and the decrease command step STD of the first step PR1 is ended while remaining the number of unreached stages at which the combustion tolerance range cannot be confirmed. Further, in this example, in the increase command step STU of the second step PR2, the confirmation of the combustion tolerance range is executed with the unreached stage S added to the target tolerance upper limit value TMUL, and the combustion tolerance confirmation step S20 is ended. Other procedures except for a difference in priority ranking between the increase command step STU and the decrease command step STD are the same as those in the second combustion tolerance confirmation pattern shown in FIG. 5. In this pattern, in the decrease command step STD of the first step PR1, the command value CM of the stage S immediately before the stage S where combustion oscillation occurs is set as the actual tolerance lower limit value AMLL, and in the increase command step STU of the second step PR2, the command value CM of the stage S in which the number of unreached stages is added to the target tolerance upper limit value TMUL is set as the actual tolerance upper limit value AMUL. The combustion tolerance range confirmed by this pattern (the width between the actual tolerance upper limit value AMUL and the actual tolerance lower limit value AMLL) is the same as the target tolerance width TMW at the time of initial setting.

Similar to the second combustion tolerance confirmation pattern shown in FIG. 5, it is desirable that the position of the origin OP in the fourth combustion tolerance confirmation pattern is the intermediate position (midpoint position) between the actual tolerance lower limit value AMLL of the decrease command step STD and the actual tolerance upper limit value AMUL of the increase command step STU. Therefore, the origin OP after the confirmation of the combustion tolerance range is moved to the position of the command value CM to which the number of unreached stages are added in the direction of increasing the command value CM from the origin OP at the time of initial setting, and is set as the new origin NOP. After the collection of the steady data 128 in the increase command step STU has ended, the command value CM is moved to the position of the new origin NOP at a predetermined cancellation rate BRR at the time of return to the origin, and the second step PR2 is ended. In the decrease command step STD, when the command value CM, which is the stage S immediately before the stage S where combustion oscillation occurs, is at the actual tolerance lower limit value AMLL, the retention time T2 is maintained from the point in time PF when combustion oscillation has occurred, and the steady data 128 of the gas turbine 1 is collected and sent to the database 127. In the increase command step STU as well, the steady data 128 of the gas turbine 1 collected at the command value CM in the actual tolerance upper limit value AMUL is sent to the database 127.

<<Overall Combustion Adjustment Process>>

Figure 8:
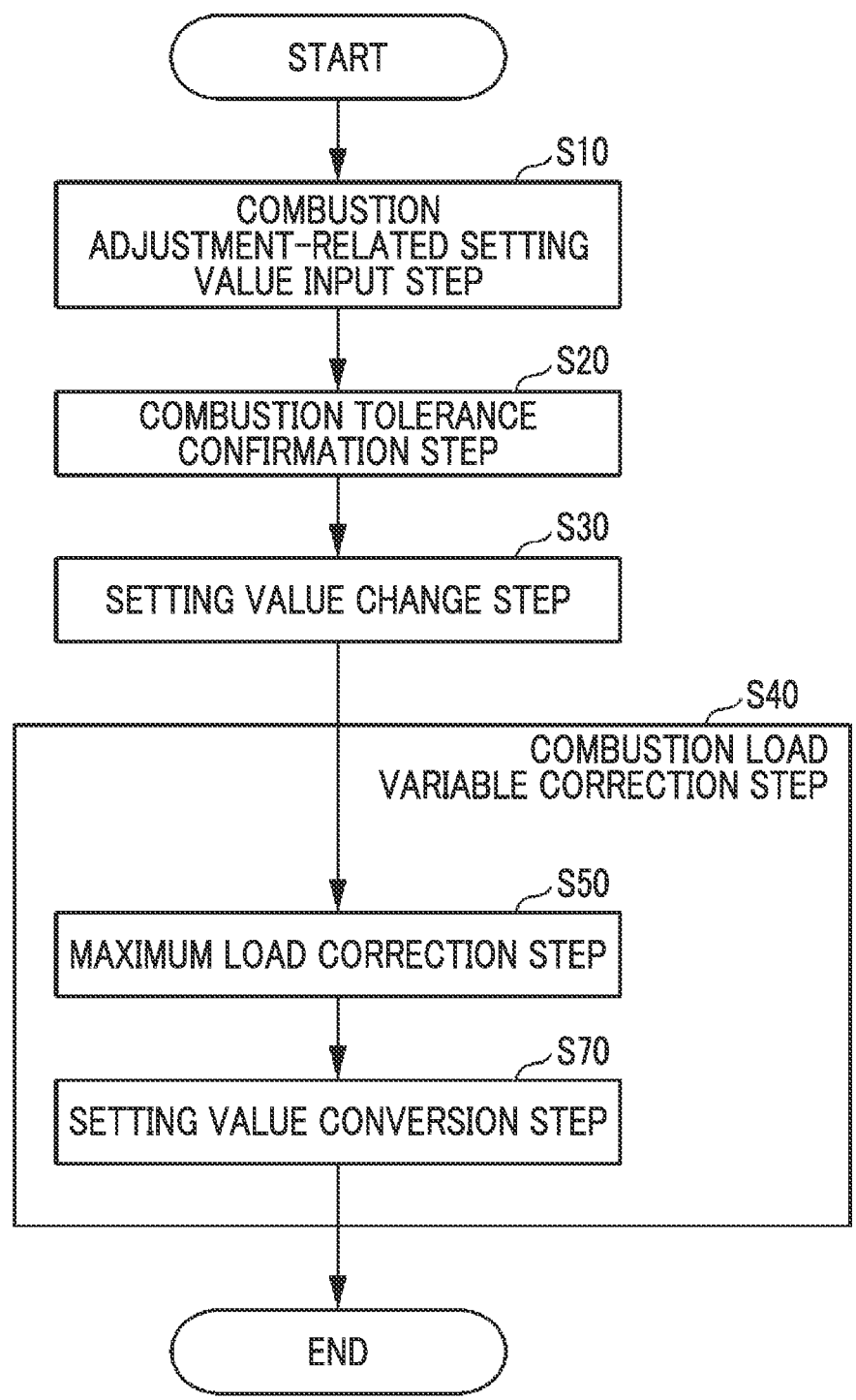
FIG. 8 is a flow chart showing an overall process of a combustion tolerance adjustment unit.

The flow of the overall process of the combustion adjustment of the gas turbine will be described below on the premise of various combustion tolerance confirmation patterns as described above. As described above, the confirmation of the combustion tolerance range is performed by selecting a plurality of GT loads including the rated load within the range from the GT load, which is no-load (0(%), to the rated load (GT load 100%). At that time, in the confirmation of the combustion tolerance range, in consideration of ease of the occurrence of combustion oscillations or the like, either a GT load increase direction of increasing the GT load with the GT load at the time of the start of the confirmation of the combustion tolerance range as a minimum load, or a GT load decrease direction of decreasing the GT load with the GT load as a maximum load is preferentially selected. FIG. 8 is a flow chart showing the overall process of the combustion adjustment in the direction of increasing the GT load. However, the flow of the overall process shown in FIG. 8 is an example, and the flow is not limited to this example. For example, in the example of FIG. 8, a combustion load variable correction step S40 is executed after the combustion tolerance confirmation step S20. However, the combustion load variable correction step S40 may be executed before the combustion tolerance confirmation step S20.

FIG. 8 shows the overall process including the combustion tolerance confirmation step S20 in the direction of increasing the GT load from a small GT load toward the rated load (100%) of a large GT load with respect to a plurality of GT loads selected in order to perform combustion adjustment. As shown in FIG. 8, the overall process that is executed by the combustion tolerance adjustment unit 130 shown in FIG. 3 includes, in executing the combustion tolerance adjustment in the direction of increasing the GT load, a combustion adjustment-related setting value input step S10 that takes in various operation data and parameters, the combustion tolerance confirmation step S20 of confirming the combustion tolerance range of the combustion parameter PM by operating the gas turbine 1, a setting value change step S30 of changing the setting value of the combustion load variable CLP, based on the new origin NOP, in a case where the origin shift occurs in the combustion tolerance confirmation step S20, and the combustion load variable correction step S40 that includes a maximum load correction step S50 of correcting the planned maximum output such that the combustion load variable CLP at the planned maximum output becomes the rated value (100%), and a setting value conversion step S70 of correcting the combustion load variable CLP after correction such that the relationship between the gas turbine inlet temperature GTIT and the combustion parameter PM is maintained. In a case where the origin shift does not occur in the combustion tolerance confirmation step S20, the next combustion load variable correction step S40 may be executed without executing the setting value change step S30.

<<Combustion Adjustment-Related Setting Value Input Step>>

In the combustion adjustment-related setting value input step S10, a GT load range, a priority ranking of the combustion parameters PM, a setting value of the combustion load variable CLP of the combustion parameter PM, the target tolerance width TMW, the input rate BIR of the command value CM, the retention time T1 in each stage S, the retention time T2 required for collection of the steady data 128, the cancellation rate BRR at the time of return to the origin, the stage width SW, and a number of stages SN are input to the input unit 121 and sent to the combustion tolerance confirmation step S20. As described above, the combustion tolerance confirmation step S20 adopts a bias input method in which the confirmation of the combustion tolerance range is performed while the command value CM of the combustion parameter PM is changed along the stepped stage S. As shown in FIGS. 4 to 7, the target tolerance width TMW of the combustion parameter PM is divided into the increase command step STU and the decrease command step STD with the same stage width SW with the origin OP as the center, and with respect to each step, the same stage width SW, the same number of stages SN, and the same input rate BIR between the stages are provided as input data. The stage width SW of each stage S in the increase command step STU and the stage width SW of each stage S in the decrease command step STD may be the same width or different widths between the increase command step STU and the decrease command step STD.

<<Combustion Tolerance Confirmation Step>>

Figure 9:
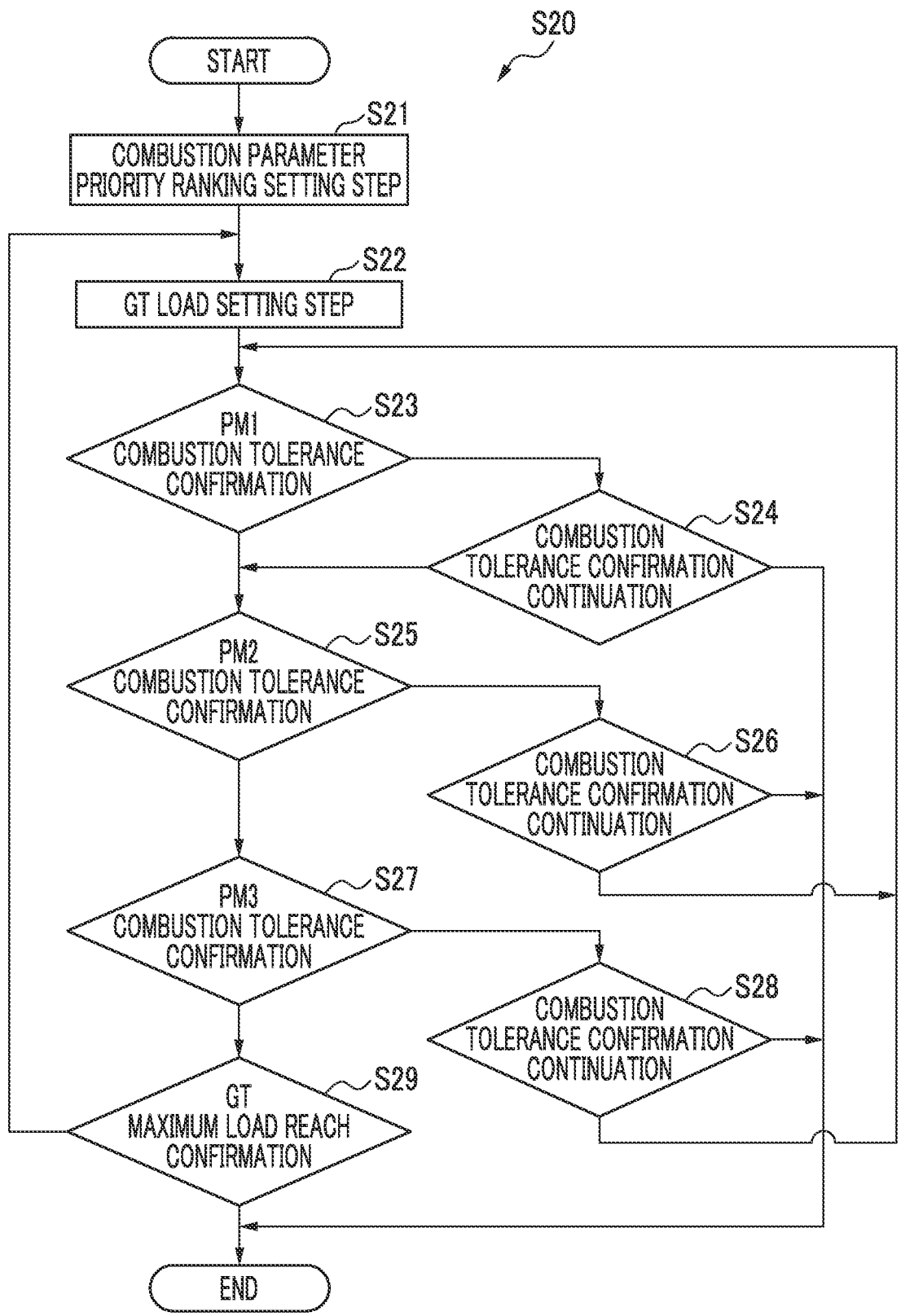
FIG. 9 is a flow chart showing a combustion tolerance confirmation step.

FIG. 9 shows the flow of the combustion tolerance confirmation step S20 of the combustion parameter PM. The processing of confirming the combustion tolerance range is started based on the combustion tolerance confirmation step S20 shown in FIG. 9. In the combustion tolerance confirmation step S20, first, the priority ranking of the combustion parameters PM for which the combustion tolerance range is to be confirmed is set. The priority ranking of the combustion parameters PM for which the confirmation of the combustion tolerance range is to be executed is set based on the priority ranking of the combustion parameters PM input by the input unit 121, the combustion parameter PM of the first priority ranking is assigned as PM1, the combustion parameter PM of the second priority ranking is assigned as PM2, and the combustion parameter PM of the third priority ranking is assigned as PM3 (S21).

Priority degree pattern data for the confirmation of the combustion tolerance range stored in the database 127 of the automatic combustion adjustment unit 120 may be called out to set the priority ranking of the combustion parameters PM. The priority degree pattern data may be, for example, a database in which the priority ranking of the combustion parameters PM can be automatically selected based on the combustion load variable CLP. Further, the priority degree pattern data may include data that determines the priority ranking of the increase command step STU or of the decrease command step STD according to the combustion load variable CLP with respect to the set combustion parameter PM.

After the assignment of the priority ranking of the combustion parameters PM has ended in the combustion parameter priority ranking setting step S21, a gas turbine load (GT load) for executing the confirmation of the combustion tolerance range is set (S22). In the setting of the GT load, a plurality of GT loads are set in the GT load range of 0 to 100%, as described above. The selected GT load is input to the input unit 121. The GT load 100% corresponds to the planned maximum output or the rated output, and the GT load 0% corresponds to output at the time of no-load. In the confirmation of the combustion tolerance range, it is desirable to execute the confirmation of the combustion tolerance range at the same GT load until the confirmation of the combustion tolerance range for each of all the combustion parameters (the pilot ratio PL, the top hat ratio TH, and the bypass valve opening degree BV) has ended.

After the GT load for the confirmation of the combustion tolerance range is set in the GT load setting step S22, the combustion tolerance confirmation of the first combustion parameter PM1 with the first priority is executed (S23). Specific implementation procedure and implementation content of confirmation of the combustion tolerance range of the first combustion parameter PM1 with the first priority are performed along any one of the first combustion tolerance confirmation pattern, the second combustion tolerance confirmation pattern, and the fourth combustion tolerance confirmation pattern shown in FIG. 4, FIG. 5, and FIG. 7 (S23). In the combustion tolerance confirmation of the first combustion parameter PM1, in a case where combustion oscillation does not occur in both steps of the increase command step STU and the decrease command step STD, the combustion tolerance confirmation of the first combustion parameter PM1 is ended, and it is determined that the combustion tolerance confirmation step S20 should be continued (S23), and the routine proceeds to the next step (S25). The position of an origin OP1 of the first combustion parameter PM1 is maintained. In the following description, the origins OP of the first combustion parameter PM1, the second combustion parameter PM2, and the third combustion parameter PM3 are represented by OP1, OP2, and OP3, the new origins NOP are represented by NOP1, NOP2, and NOP3, and the target tolerance widths TMW are represented by TMW1, TMW2, and TMW3.

In the confirmation of the combustion tolerance range of the first combustion parameter PM1, in a case where combustion oscillation occurs in either the increase command step STU or the decrease command step STD, it is determined whether or not the target tolerance width TMW1, which is a predetermined combustion tolerance width, can be secured by performing an origin shift (S24). If it is determined that the predetermined combustion tolerance range of the first combustion parameter PM1 can be secured, the combustion tolerance confirmation of the first combustion parameter PM1 is ended, it is determined that the combustion tolerance confirmation step S20 should be continued (S24), and the routine proceeds to the next step (S25).

In the case of this embodiment, since the origin shift of the first combustion parameter PM1 has occurred, the position of the origin OP1 of the first combustion parameter PM1 is moved to the new origin NOP1. The collected steady data 128 of the gas turbine 1 and the position data of the new origin NOP1 for the first combustion parameter PM1 are sent to the database 127 (S24).

Next, in a case where it is determined that the combustion tolerance confirmation step S20 should be continued (S24), the routine proceeds to the confirmation of the combustion tolerance range of the second combustion parameter PM2. In the case of the third combustion tolerance confirmation pattern shown in FIG. 6, the target tolerance width TMW1, which is a predetermined combustion tolerance width, cannot be secured. However, if it is determined that the range in which combustion oscillation does not occur even in a tolerance width narrower than the target tolerance width TMW1 can be maintained, it is determined that the combustion tolerance width necessary for the continuation of the stable operation of the gas turbine 1 is secured. In that case, the confirmation of the combustion tolerance range of the first combustion parameter PM1 is ended, it is determined that the combustion tolerance confirmation step S20 should be continued (S24), and the routine proceeds to the next step (S25). In a case where it is determined that the combustion tolerance width necessary for the stable operation of the gas turbine 1 of the first combustion parameter PM1 cannot be secured, it is determined that the combustion tolerance confirmation step S20 cannot be continued, and the combustion tolerance confirmation step S20 is ended (S24).

When the confirmation of the combustion tolerance range of the first combustion parameter PM1 has ended and it is determined that the combustion tolerance confirmation step S20 should be continued, the combustion tolerance confirmation of the second combustion parameter PM2 is executed (S25). Specific implementation procedure and work content of the confirmation of the combustion tolerance range of the second combustion parameter PM2 are as shown in any one of the first combustion tolerance confirmation pattern, the second combustion tolerance confirmation pattern, and the fourth combustion tolerance confirmation pattern shown in FIG. 4, FIG. 5, and FIG. 7, similar to the first combustion parameter PM1. With respect to the second combustion parameter PM2, in a case where combustion oscillation does not occur in both the increase command step STU and the decrease command step STD, the combustion tolerance confirmation of the second combustion parameter PM2 is ended, it is determined that the combustion tolerance confirmation step S20 should be continued (S25), and the routine proceeds to the next step (S27). In this case, the position of the origin OP2 of the second combustion parameter PM2 is maintained.

In the confirmation of the combustion tolerance range of the second combustion parameter PM2, in a case where combustion oscillation occurs in either the increase command step STU or the decrease command step STD of the second combustion parameter PM2, the origin shift of the second combustion parameter PM2 is performed, and it is determined whether or not the target tolerance width TMW2, which is a predetermined combustion tolerance range, can be secured (S26). If it is determined that the predetermined target tolerance width TMW2 of the second combustion parameter PM2 can be secured, the confirmation of the combustion tolerance range of the second combustion parameter PM2 is ended, and it is determined that the combustion tolerance confirmation step S20 should be continued (S26).

However, in the case of this embodiment, since the origin shift of the second combustion parameter PM2 has occurred, the position of the origin OP2 of the second combustion parameter PM2 is moved to the new origin NOP2, and the routine returns to the step (S23) of confirming the combustion tolerance of the first combustion parameter PM1, which is the combustion parameter PM with the first priority (S26). The reason for returning to the step (S23) of confirming the combustion tolerance of the first combustion parameter PM1 is because, in the step (S25) of confirming the combustion tolerance of the second combustion parameter PM2, the origin shift of the second combustion parameter PM2 occurs, the position of the origin OP2 of the second combustion parameter PM2 moves to the position of the new origin NOP2, and the combustion condition of the combustor 3 from which the steady data 128 of the first combustion parameter PM1 is to be collected changes. Further, since the origin shift of the second combustion parameter PM2 has occurred, the position of the origin OP2 is moved to the new origin NOP2, and the position of the new origin NOP2 is sent to the database 127 together with the collected steady data 128 of the gas turbine 1 with respect to the second combustion parameter PM2.

In a case where the step (S25) of confirming the combustion tolerance range of the second combustion parameter PM2 is the third combustion tolerance confirmation pattern shown in FIG. 6, the target tolerance width TMW2, which is a predetermined combustion tolerance width, cannot be secured. However, it is determined that the range in which combustion oscillation does not occur even in the tolerance width narrower than the target tolerance width TMW2 can be maintained. In that case, it is determined that the combustion tolerance width necessary for continuing the stable operation of the gas turbine 1 is secured, the confirmation of the combustion tolerance range of the second combustion parameter PM2 is ended, and it is determined that the combustion tolerance confirmation step S20 should be continued (S26). In the case of this embodiment as well, similar to the reason described above, since the origin shift of the second combustion parameter PM2 has occurred, the position of the origin OP2 of the second combustion parameter PM2 is moved to the new origin NOP2, and the routine returns to the step (S23) of confirming the combustion tolerance range of the first combustion parameter PM1, which is the combustion parameter with the first priority (S26). In a case where it is determined that the predetermined combustion tolerance range of the second combustion parameter PM2 cannot be secured, it is determined that the combustion tolerance confirmation step S20 cannot be continued, and the combustion tolerance confirmation step S20 is ended (S26).

In a case where the combustion tolerance confirmation of the second combustion parameter PM2 is ended and the routine returns to the step (S23) of confirming the combustion tolerance of the first combustion parameter PM1, the confirmation of the combustion tolerance range of the first combustion parameter PM1 is executed again, and the presence or absence of the occurrence of combustion oscillation is reconfirmed (S23). The procedure after the execution of the combustion tolerance confirmation of the first combustion parameter PM1 (S23) is the same as the procedure described above.

When the combustion tolerance confirmation of the second combustion parameter PM2 has ended and it is determined that the combustion tolerance confirmation step S20 should be continued, the combustion tolerance confirmation of the third combustion parameter PM3 is executed (S27). Specific implementation procedure and work content of the combustion tolerance confirmation of the third combustion parameter PM3 are as shown in any one of the first combustion tolerance confirmation pattern, the second combustion tolerance confirmation pattern, and the fourth combustion tolerance confirmation pattern shown in FIG. 4, FIG. 5, and FIG. 7. With respect to the third combustion parameter PM3, in a case where combustion oscillation does not occur in both steps of the increase command step STU and the decrease command step STD, the confirmation of the combustion tolerance range of the third combustion parameter PM3 is ended, it is determined that the combustion tolerance confirmation step S20 should be continued (S27), and the routine proceeds to the next step (S29). The position of the origin OP3 of the third combustion parameter PM3 is maintained, and the collected steady data 128 of the gas turbine 1 for the third combustion parameter PM3 is sent to the database 127.

In the combustion tolerance confirmation of the third combustion parameter PM3, in a case where combustion oscillation occurs in either the increase command step TU3 or the decrease command step STD, it is determined whether or not the target tolerance width TMW3, which is a predetermined combustion tolerance range, can be secured by performing the origin shift (S28). If it is determined that the predetermined target tolerance width TMW3 of the third combustion parameter PM3 can be secured, the combustion tolerance confirmation of the third combustion parameter PM3 is ended, and it is determined that the combustion tolerance confirmation step S20 should be continued. (S28).

In the case of the present embodiment, similar to the embodiment in which the origin shift occurs in the combustion tolerance confirmation of the second combustion parameter PM2 described above, since the origin shift of the third combustion parameter PM3 has occurred, the position of the origin OP3 of the third combustion parameter PM3 is moved to the new origin NOP3, and the routine returns to the step (S23) of confirming the combustion tolerance of the first combustion parameter PM1 (S26). The reason for returning to the step (S23) of confirming the combustion tolerance of the first combustion parameter PM1 is the same as that in a case where the origin shift of the second combustion parameter PM2 occurs. Further, the collected steady data 128 of the gas turbine 1 for the third combustion parameter PM3 is sent to the database 127 together with the position data of the new origin NOP3.

In a case where the step (S27) of confirming the combustion tolerance of the third combustion parameter PM3 is the third combustion tolerance confirmation pattern shown in FIG. 6, the target tolerance width TMW3, which is a predetermined combustion tolerance width, cannot be secured. However, if it is determined that the range in which combustion oscillation does not occur even in the tolerance width narrower than the target tolerance width TMW3 can be maintained, it is determined that the combustion tolerance width necessary for the continuation of the stable operation of the gas turbine 1 is secured, the combustion tolerance confirmation of the third combustion parameter PM3 is ended, and it is determined that the combustion tolerance confirmation step S20 should be continued (S28). In the case of this embodiment as well, similar to the reason described above, since the origin shift of the third combustion parameter PM3 has occurred, the position of the origin OP3 of the third combustion parameter PM3 is moved to the new origin NOP3, and the routine returns to the step (S23) of confirming the combustion tolerance range of the first combustion parameter PM1 (S28). In a case where it is determined that the predetermined combustion tolerance range of the third combustion parameter PM3 cannot be secured, it is determined that the combustion tolerance confirmation step S20 cannot be continued, and the combustion tolerance confirmation step S20 is ended (S28).

In a case where the combustion tolerance confirmation of the third combustion parameter PM3 has ended (S28) and the routine returns to the step (S23) of confirming the combustion tolerance of the first combustion parameter PM1, the confirmation of the combustion tolerance range of the first combustion parameter PM1 is executed again, and the presence or absence of the occurrence of combustion oscillation is reconfirmed (S23). The procedure for executing or the like for confirming the combustion tolerance of the first combustion parameter PM1 is the same as the content described above.

After the combustion tolerance confirmation of the third combustion parameter PM3 has ended (S28), the routine proceeds to the next step (S29), and it is determined whether or not the GT load has reached the maximum load (S29). In a case where the GT load has not reached the maximum load, the routine returns to the GT load setting step S22, and the next GT load is set from the GT load at the time of initial setting (S22). The combustion tolerance confirmation of the combustion parameters is repeated based on the new GT load (S23 to S29). When the GT load has reached the maximum load, the combustion tolerance confirmation step S20 is ended (S29), and the routine proceeds to the setting value change step S30 shown in FIG. 8. In a case where it is determined that the predetermined combustion tolerance range of the third combustion parameter PM3 cannot be secured, it is determined that the combustion tolerance confirmation step S20 cannot be continued, and the combustion tolerance confirmation step S20 is ended (S28). The flow shown in FIG. 9 is the combustion tolerance confirmation step S20 in the direction of increasing the GT load. However, in the case of the combustion tolerance confirmation step S20 in the direction of decreasing the GT load, it is determined whether or not the GT load has reached the minimum load (S29), the next GT load is set (S22), and the combustion tolerance confirmation step S20 is executed.

<<Combustion Load Variable Correction Step>>

As shown in FIG. 8, the combustion load variable correction step S40 is a step of performing correction necessary for optimizing the setting value ST indicating the relationship between the combustion parameter PM and the combustion load variable CLP such that the gas turbine 1 outputs the planned maximum output MOP at the rated value (100%) of the combustion load variable CLP. That is, the combustion load variable correction step S40 includes the maximum load correction step S50 of correcting the combustion load variable CLP such that the combustion load variable CLP becomes the rated value (100%) at the planned maximum output MOP of the gas turbine 1, on the premise that an appropriate relationship between the gas turbine inlet temperature GTIT and the combustion parameter PM is maintained, and the setting value conversion step S70 of converting the setting value of the combustion load variable CLP such that the relationship between the gas turbine inlet temperature GTIT and the combustion parameter PM is maintained, based on the combustion load variable CLP after correction.

The control of the GT load is executed using the combustion load variable CLP expressed by the following expression, instead of the gas turbine inlet temperature GTIT. Specifically, the control of the GT load (GT output) is controlled by the pilot ratio PL, the top hat ratio TH, the bypass valve opening degree BV, or the like, which are combustion parameters PM, and each combustion parameter PM is expressed by the function of the combustion load variable CLP. The combustion load variable CLP of the combustion parameter PM can be calculated by Expression 1 shown below.

combustion load variable CLP(%)=[(turbine output−no-load equivalent output)/(planned maximum output−no-load equivalent output)]×100    [Expression 1]:

Here, the planned maximum output MOP refers to the turbine output (gas turbine output) at planned output or rated output, and the no-load equivalent output NOP refers to the turbine output at no-load. In a case where the turbine output is the planned maximum output MOP or the rated output, the combustion load variable CLP is the rated value (100%), and in a case of being the no-load equivalent output NOP, the combustion load variable CLP is equivalent to 0(%).

At the time of the start of a trial run of the gas turbine or at the time of restarting operation after regular inspection, there is a case where slight deviation occurs in the relationship between the gas turbine inlet temperature GTIT and the combustion load variable CLP, which are necessary for proper combustion control of the combustor 3. As described above, the combustion adjustment of the gas turbine 1 is controlled by the combustion parameter PM with the combustion load variable CLP as a function. Therefore, deviation of the combustion load variable CLP with respect to the gas turbine inlet temperature GTIT causes a state where combustion oscillation easily occurs, and may adversely affect combustion adjustment. Therefore, in order to effectively utilize the steady data 128 acquired in the combustion tolerance confirmation step S20, it is desirable that the result of the combustion tolerance confirmation step S20 is correctly reflected in the setting value indicating the relationship between the combustion parameter PM and the combustion load variable CLP and that the combustion load variable CLP is corrected in order to allow the gas turbine to enter steady operation.

The basic concept of the correction of the setting values of the combustion parameter PM and the combustion load variable CLP which are applied to the combustion control of the combustor 3 will be described with reference to FIGS. 10A to 10C and FIGS. 11A to 11C. In order to execute proper combustion control of the gas turbine 1, it is necessary for the relationship between the combustion parameter PM and the combustion load variable CLP to be set such that the planned maximum load (planned maximum output) MOP is output at the rated value (100%) of the combustion load variable CLP, while maintaining the relationship between the gas turbine inlet temperature GTIT and the combustion parameter PM. Since the combustion control device 100 is set such that the combustion load variable CLP corresponding to the planned maximum output MOP becomes the rated value (100%), even if the setting value of the combustion load variable CLP is set lower than the rated value or set higher than the rated value, proper combustion control is not performed, and the control of the gas turbine 1 is adversely affected. That is, by providing the combustion load variable correction step S40 and correcting the deviation of the combustion load variable CLP at the time of initial setting such as the time of a trial run or the time of restarting operation after regular inspection, a learning circuit, which will be described later, is appropriately operated, and the long-term steady operation of the gas turbine 1 can be continued.

Figure 10A:
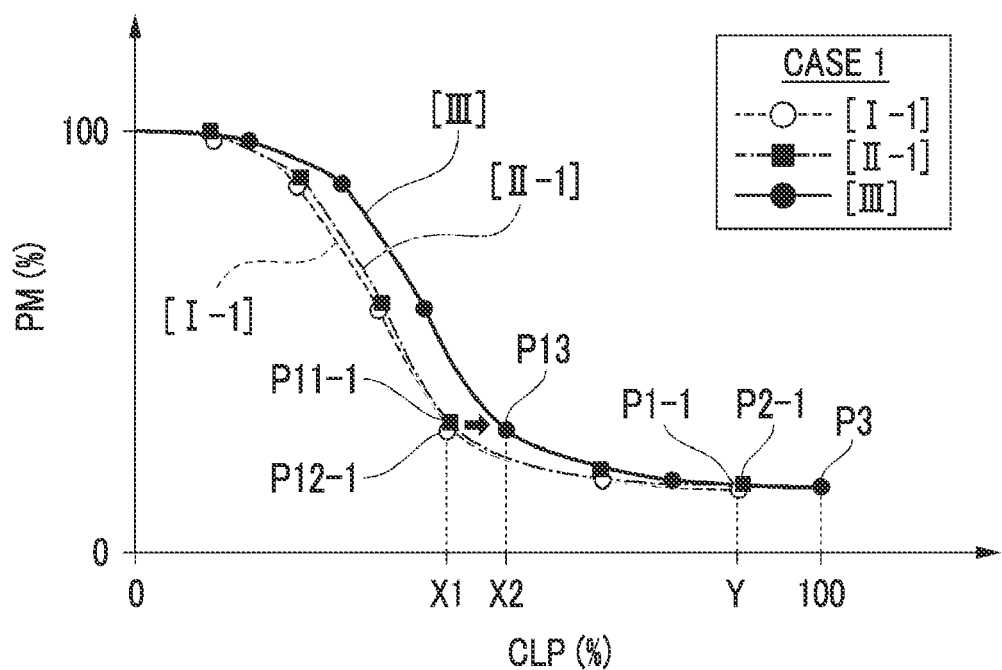
FIG. 10A is a diagram showing a relationship between a combustion parameter and a combustion load variable in Case 1.
Figure 10B:
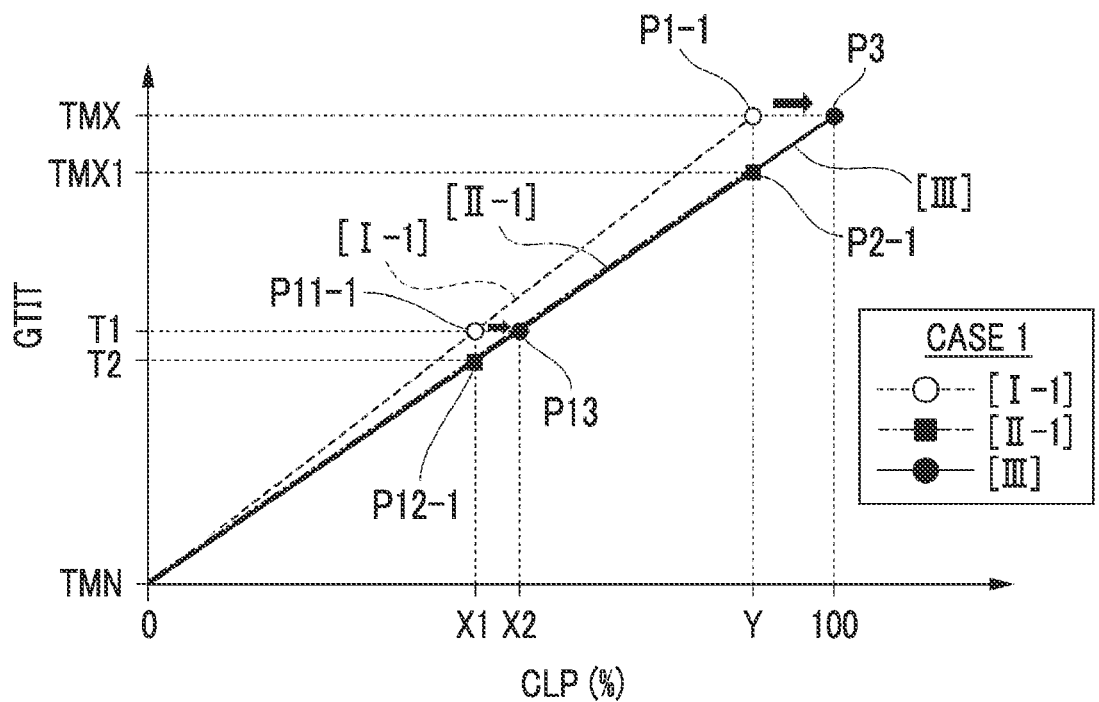
FIG. 10B is a diagram showing a relationship between a gas turbine inlet temperature and a combustion load coefficient in Case 1.
Figure 10C:
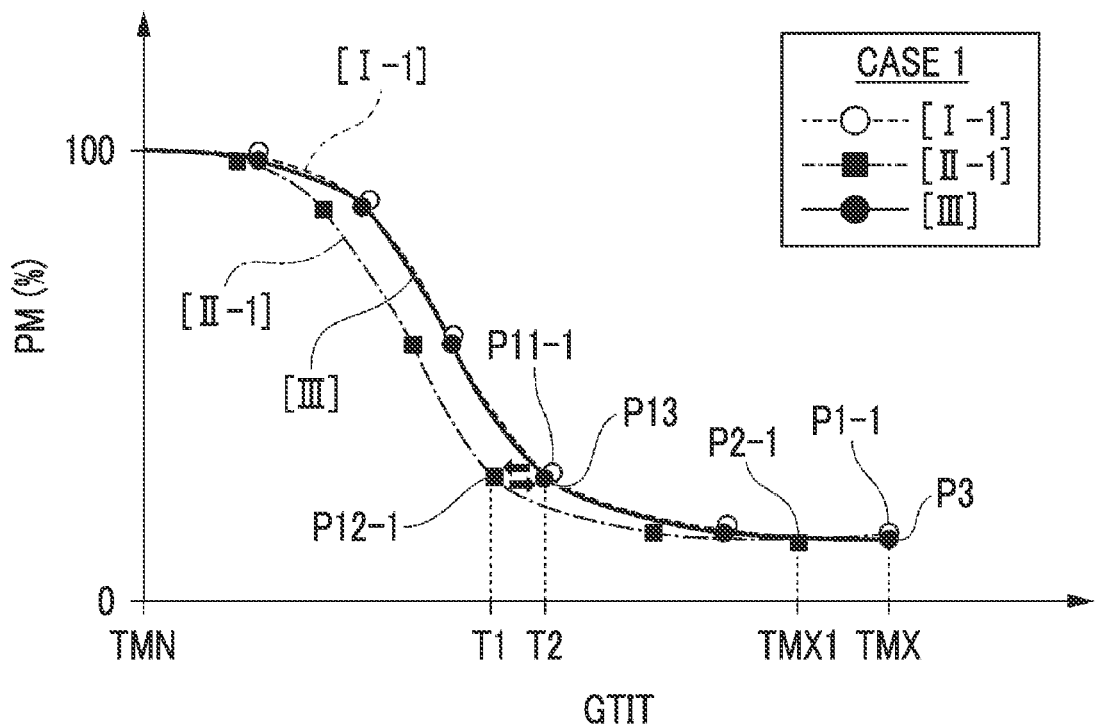
FIG. 10C is a diagram showing a relationship between the combustion parameter and the gas turbine inlet temperature in Case 1.

FIGS. 10A to 10C show the concept of correction means in a case where the gas turbine 1 reaches the planned maximum output MOP at the position where the combustion load variable CLP does not reach the rated value (100%) (Case 1). FIG. 10A is a diagram showing the relationship between the combustion parameter PM and the combustion load variable CLP in Case 1, with the combustion parameter PM represented on the vertical axis and the combustion load variable CLP represented on the horizontal axis. FIG. 10B is a diagram showing the relationship between the gas turbine inlet temperature GTIT and the combustion load variable CLP in Case 1, with the gas turbine inlet temperature GTIT represented on the vertical axis and the combustion load variable CLP represented on the horizontal axis. FIG. 10C is a diagram showing the relationship between the gas turbine inlet temperature GTIT and the combustion parameter PM in Case 1, with the combustion parameter PM represented on the vertical axis and the gas turbine inlet temperature GTIT represented on the horizontal axis. Common to FIGS. 10A to 10C, a curved line [I-1] and a straight line [I-1] each shown by a dashed line are data immediately after being acquired in the combustion tolerance confirmation step S20. A curved line [II-1] and a straight line [II-1] each shown by a dot-dashed line are data after being corrected in the maximum load correction step S50. A curved line [III] and a straight line [III] each shown by a solid line are data after being converted in the setting value conversion step S70.

Figure 11A:
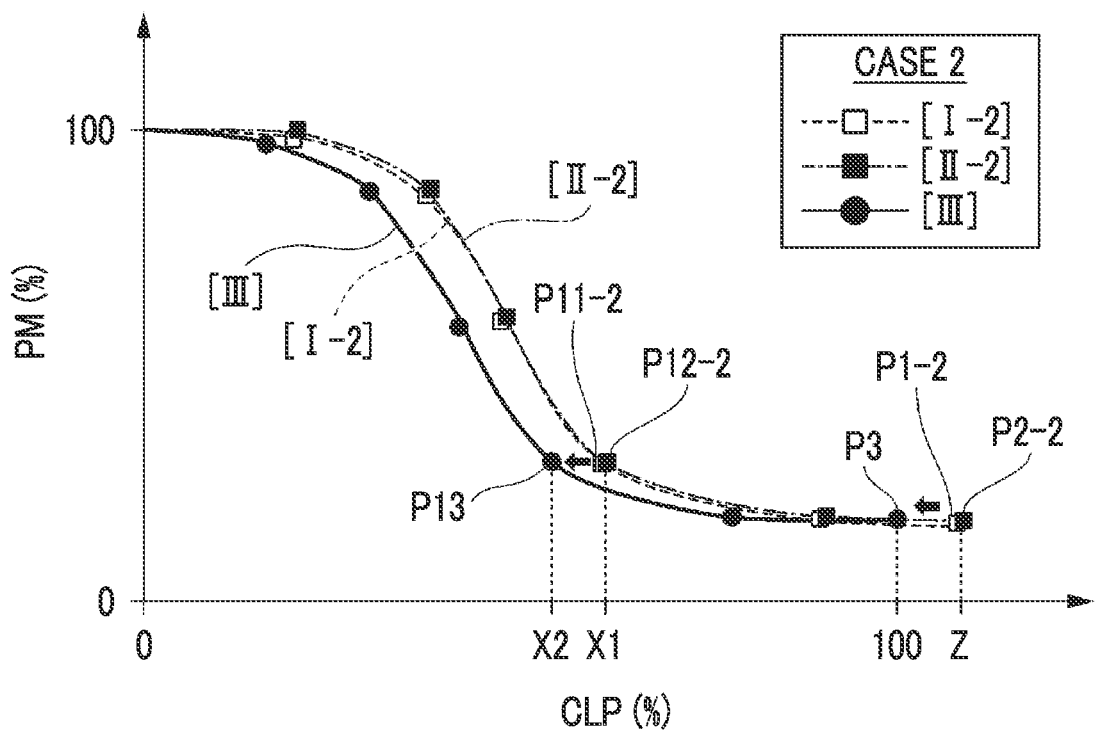
FIG. 11A is a diagram showing a relationship between the combustion parameter and the combustion load variable in Case 2.
Figure 11B:
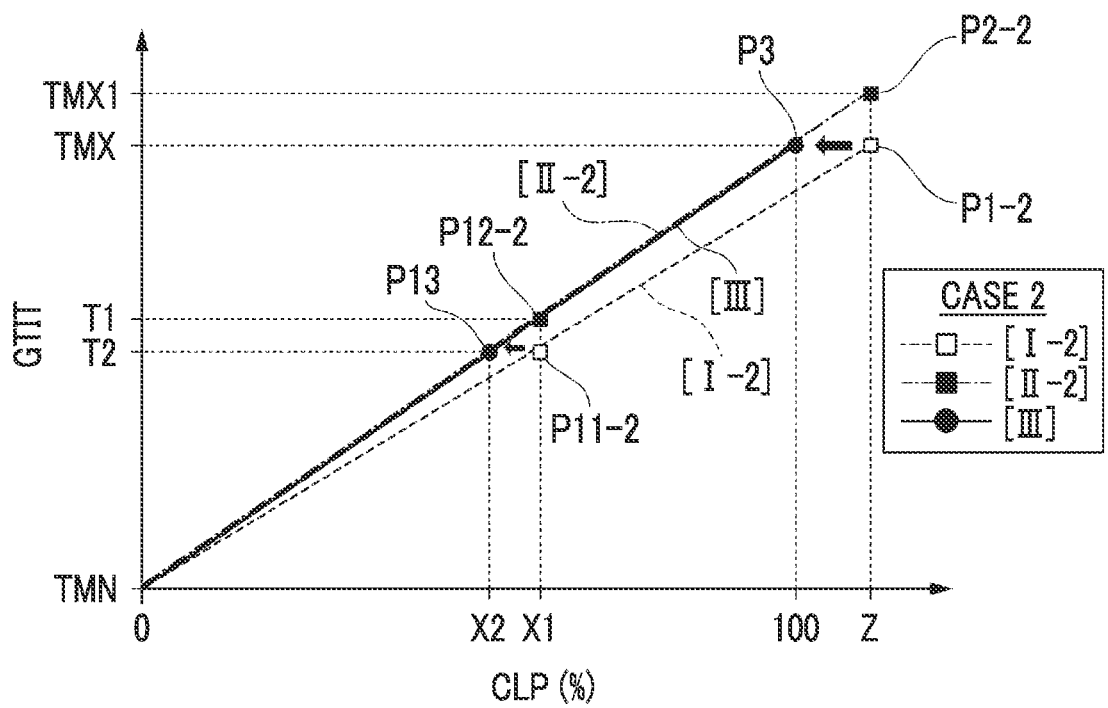
FIG. 11B is a diagram showing a relationship between the gas turbine inlet temperature and the combustion load coefficient in Case 2.
Figure 11C:
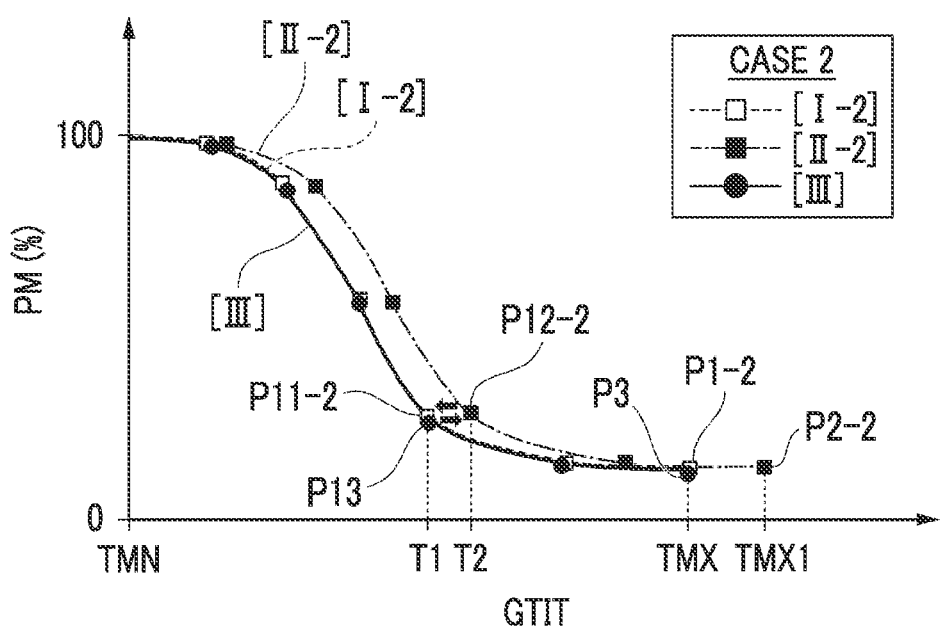
FIG. 11C is a diagram showing a relationship between the combustion parameter and the gas turbine inlet temperature in Case 2.

FIGS. 11A to 11C show the concept of correction means in a case where the gas turbine 1 reaches the planned maximum output MOP at the position where the setting value ST of the combustion load variable CLP exceeds the rated value (100%) (Case 2). FIG. 11A is a diagram showing the relationship between the combustion parameter PM and the combustion load variable CLP in Case 2, with the combustion parameter PM represented on the vertical axis and the combustion load variable CLP represented on the horizontal axis. FIG. 11B is a diagram showing the relationship between the gas turbine inlet temperature GTIT and the combustion load variable CLP in Case 2, with the gas turbine inlet temperature GTIT represented on the vertical axis and the combustion load variable CLP represented on the horizontal axis. FIG. 11C is a diagram showing the relationship between the gas turbine inlet temperature GTIT and the combustion parameter PM in Case 2, with the combustion parameter PM represented on the vertical axis and the gas turbine inlet temperature GTIT represented on the horizontal axis. Common to FIGS. 11A to 11C, a curved line [I-2] and a straight line [I-2] each shown by a dashed line are data immediately after being acquired in the combustion tolerance confirmation step S20. A curved line [II-2] and a straight line [II-2] each shown by a dot-dashed line are data after being corrected in the maximum load correction step S50. A curved line [III] and a straight line [III] each shown by a solid line are data after being converted in the setting value conversion step S70.

Case 1 will be described with reference to FIGS. 10A to 10C. The curved line [I-1] shown in FIG. 10A shows a setting value indicating the relationship between the combustion parameter PM and the combustion load variable CLP acquired in the combustion tolerance confirmation step S20. In the case of the present embodiment, the curved line [I-1] shows an example in which the GT load increases and the combustion parameter PM decreases together with an increase in the combustion load variable CLP. The setting value shown by the curved line [I-1] indicates an optimal setting value of the combustion load variable CLP with respect to the gas turbine inlet temperature GTIT of the current apparatus, and is a setting value that enables the most appropriate combustion control without the occurrence of combustion oscillation. However, the curved line [I-1] indicates that the setting value of the combustion load variable CLP at the planned maximum output (GT load 100%) MOP is not the rated value (100%) and reaches the planned maximum output (GT load 100%) MOP at the position of Y (%) lower than the rated value (100%).

However, the combustion control device 100 is set such that the combustion load variable CLP becomes the rated value (100%) at the planned maximum output (GT load 100%) MOP. The curved line [III] shown in FIG. 10A is a setting value indicating the relationship between the combustion parameter PM incorporated in the combustion control device 100 and the combustion load variable CLP. If deviation in the coordinate axis between the rated value (100%) of the combustion load variable CLP shown on the horizontal axis and Y (%) is left as it is, the combustion control of the gas turbine 1 is adversely affected. Therefore, in order to maintain the same relationship as the setting values incorporated in the combustion control device 100, correction means is required to correct the combustion load variable CLP so as to cause the relationship of the curved line [I-1] shown in FIG. 10A to coincide with the curved line [III] while maintaining the relationship between the gas turbine inlet temperature GTIT and the combustion parameter PM. The curved line [II-1] shows the relationship between the combustion parameter PM and the combustion load variable CLP before the setting value conversion, which will be described later, and coincides with the curved line [I-1].

FIG. 10B is a diagram in which the setting value indicating the relationship between the combustion parameter PM and the combustion load variable CLP in FIG. 10A is replaced with the relationship between the gas turbine inlet temperature GTIT and the combustion load variable CLP for comparison. The relationships of the curved line [I-1], the curved line [II-1], and the curved line [III] shown in FIG. 10A are replaced with the relationships between the gas turbine inlet temperature GTIT and the combustion load variable CLP, which correspond to the straight line [I-1], the straight line [II-1], and the straight line [III] shown in FIG. 10B. All the relationships between the gas turbine inlet temperature GTIT and the combustion load variable CLP of the straight line [I-1], the straight line [II-1], and the straight line [III] shown in FIG. 10B are in a proportional relationship.

FIG. 10C is a diagram in which the setting value indicating the relationship between the combustion parameter PM and the combustion load variable CLP shown in FIG. 10A is replaced with the relationship between the combustion parameter PM and the gas turbine inlet temperature GTIT for comparison. The relationships of the curved line [I-1], the curved line [II-1], and the curved line [III] shown in FIG. 10A are replaced with the relationships between the gas turbine inlet temperature GTIT and the combustion load variable CLP, which correspond to the curved line [I-1], the curved line [II-1], and the curved line [III] shown in FIG. 10C.

Prior to the specific description of the means for correcting the combustion load variable CLP, the outline of the correction means will be described below. The significance of the correction based on Expression 2, which is specific correction means to be described later, is to correct the relationship between the GT load and the combustion load variable CLP while maintaining the relationship between the gas turbine inlet temperature GTIT and the combustion parameter PM. In FIG. 10B, it is favorable if correction means is applied which causes the straight line [I-1] to coincide with the straight line [III] by correcting the position of a point P1-1 in the direction of reducing a difference (deviation) in the combustion load variable CLP between the position of the point P1-1 corresponding to the combustion load variable Y (%) at a maximum output temperature TMX (the gas turbine inlet temperature GTIT corresponding to the planned maximum output) showing the deviation of the initial setting value, and the position of a point P3 corresponding to the rated value (100%) of the combustion load variable CLP. The data of the straight line [I-1] is replaced with the data of the straight line [III] by the correction means, so that the deviation of the combustion load variable CLP at the time of initial setting is eliminated.

Expression 2 to be described later provides the correction means for correcting the straight line [1-1] to the straight line [III] by moving the straight line [1-1] to the position of the straight line [III] until the position of the point P1-1 at the maximum output temperature TMX coincides with the position of the point P3 in FIG. 10B. By executing the correction means according to Expression 2, the straight line [1-1] is converted to the straight line [II-1] which is at a position overlapping the straight line [III] passing through the point P3 indicating the maximum output temperature TMX at the position of the rated value (100%) of the combustion load variable CLP and in which the combustion load variable CLP is in a range of 0 to Y (%). In a case where the straight line [I-1] is corrected to be converted to the straight line [II-1], the position of the point P1-1 on the straight line [II-1] is moved to the point P2-1 on the straight line [II-1] at the combustion load variable CLP of Y (%), and the gas turbine inlet temperature GTIT at the combustion load variable CLP of Y (%) is lowered from the inlet temperature TMX to an inlet temperature TMX1 (inlet temperature at Y (%) of the combustion load variable CLP after correction). That is, the curved line [I-1] showing the relationship between the combustion parameter PM and the combustion load variable CLP shown in FIG. 10A is replaced with the straight line [II-1] shown in FIG. 10B, and the gas turbine inlet temperature GTIT with respect to the combustion load variable CLP is lowered.

Looking at this relationship in FIG. 10C, the combustion parameter PM and the gas turbine inlet temperature GTIT shown in the curved line [I-1] are corrected to the curved line [II-1] by correction. That is, the curved line [I-1], which has a setting value that enables proper combustion control after the combustion tolerance confirmation step S20 has ended, has the same relationship between the combustion parameter PM and the gas turbine inlet temperature GTIT as that in the curved line [III]. However, the curved line [II-1] corrected by correction has a relatively lower gas turbine inlet temperature GTIT than that in the curved line [III] which is a target.

Further, with respect to the position of a point P11-1 where any combustion load variable CLP on the curved line [I-1] shown in FIG. 10A and on the straight line [I-1] shown in FIG. 10B corresponds to X1(%), since due to the correction means described above, in the relationship with the combustion parameter PM in FIG. 10A, the curved line [II-1] coincides with the curved line [I-1] without being different, the position of a point P12-1 also coincides with the position of the point P11-1. On the other hand, in the relationship with the gas turbine inlet temperature GTIT in FIG. 10B, the position of the point P11-1 moves to the point P12-1 on the straight line [II-1] at the same combustion load variable CLP of X1(%). That is, the relationship between the combustion load variable CLP and the combustion parameter PM does not change even after the correction. However, in the relationship between the combustion load variable CLP and the gas turbine inlet temperature GTIT, due to the correction, the gas turbine inlet temperature GTIT at the same combustion load variable CLP is lowered. As described above, the correction means is premised on maintaining the relationship between the gas turbine inlet temperature GTIT and the combustion parameter PM, and this relationship is not maintained. Therefore, in order to satisfy the condition for maintaining the relationship between the gas turbine inlet temperature GTIT and the combustion parameter PM, other correction means is required in addition to the correction means described above.

As described above, in order to execute proper combustion control of the gas turbine 1, it is necessary to set the relationship between the combustion parameter PM and the combustion load variable CLP such that the planned maximum load (planned maximum output) MOP is output at the rated value (100%) of the combustion load variable CLP, while maintaining the relationship between the gas turbine inlet temperature GTIT and the combustion parameter PM, and it is desirable to apply correction means in line with this purpose. From this point of view, correction means is further required which causes the curved line [II-1] shown in FIG. 10C selected by the correction (the straight line [II-1] in FIG. 10B), in which the condition for maintaining the relationship between the gas turbine inlet temperature GTIT and the combustion parameter PM is not satisfied, to coincide with the curved line [III] (the straight line [III] in FIG. 10B).

Specifically, in FIG. 10C, it is favorable if the setting value of the combustion load variable CLP is converted (only the setting value of the combustion load variable CLP is slid in an axial direction of the horizontal axis) so as to make the combustion gas turbine inlet temperature GTIT shown on the horizontal axis coincide width from the inlet temperature TMX1 to the inlet temperature TMX while maintaining the combustion parameter PM on the vertical axis of the curved line [II-1] (the setting value conversion step S70). Due to the execution of the setting value conversion step S70, in FIG. 10C, without changing the combustion parameter PM, the point P2-1 on the curved line [II-1] showing the planned maximum output is moved to a point P3 on the curved line [III], and the point P12-1 (FIG. 10A) on the curved line [II-1] where any combustion load variable CLP is X1(%) is moved to a point P13 on the curved line [III] where the combustion load variable CLP is X2(%). Ultimately, the curved line [II-1] coincides with the curved line [III], and the deviation of the initial setting values is eliminated.

That is, as the correction means, it is desirable to include the maximum load correction step S50 which is correction means for making the combustion load variable CLP for outputting the planned maximum load MOP the rated value (100%), based on Expression 2, and the setting value conversion step S70 which is correction means for maintaining the relationship between the gas turbine inlet temperature GTIT and the combustion parameter PM.

By the correction means described above, the setting values of the combustion parameter PM and the combustion load variable CLP are corrected such that the planned maximum load (planned maximum output) MOP is output at the rated value (100%) of the combustion load variable CLP, while maintaining the relationship between the gas turbine inlet temperature GTIT and the combustion parameter PM. That is, although the combustion tolerance range is confirmed in the combustion tolerance confirmation step S20 and the setting value that allows proper combustion control is selected, the adverse effect on combustion control due to the deviation of the initial setting value from the rated value (100%), which is the combustion load variable CLP at which the planned maximum load (planned maximum output) MOP is output, is eliminated by the correction means. Due to the correction at the time of initial setting, long-term stable operation becomes possible even in the step of steady operation.

Although the concept of the correction means described above has been described with respect to Case 1, the same concept can also be applied to Case 2. As shown in FIG. 11A, Case 2 shows a case where the gas turbine 1 reaches the planned maximum output at the position of the combustion load variable CLP of Z (%), which is the position where the setting value of the combustion load variable CLP exceeds the rated value (100%). The curved line [I-2] shown in FIG. 11A shows the relationship between the combustion parameter PM and the setting value of the combustion load variable CLP with respect to the combustion parameter PM acquired in the combustion tolerance confirmation step S20. However, the curved line [I-2] is different from that in Case 1 in that the setting value of the combustion load variable CLP at the planned maximum output (GT load 100%) MOP is not the rated value (100%), and the combustion load variable CLP exceeding the rated value (100%) reaches the planned maximum output (GT load 100%) at the Z (%) position. The curved line [II-2] shows the relationship between the combustion parameter PM and the combustion load variable CLP after the combustion load variable CLP has been corrected in the maximum load correction step S50.

FIG. 11B is a diagram in which the relationships of the curved line [I-2], the curved line [II-2], and the curved line [III] in FIG. 11A are replaced with the relationships between the gas turbine inlet temperature GTIT and the combustion load variable CLP for comparison. The relationships of the curved line [I-2], the curved line [II-2], and the curved line [III] shown in FIG. 11A are replaced with the relationships between the gas turbine inlet temperature GTIT and the combustion load variable CLP, which correspond to the straight line [I-2], the straight line [II-2], and the straight line [III] shown in FIG. 11B. Further, FIG. 11C is a diagram in which the relationships of the curved line [I-2], the curved line [II-2], and the curved line [III] in FIG. 11A are replaced with the relationship between the combustion parameter PM and the gas turbine inlet temperature GTIT. The relationships of the curved line [I-2], the curved line [II-2], and the curved line [III] in FIG. 11A are replaced with the relationships between the gas turbine inlet temperature GTIT and the combustion load variable CLP, which correspond to the curved line [I-2], the curved line [II-2], and the curved line [III] in FIG. 11C.

The correction means in Case 2 replaces the curved line [I-1] and the curved line [II-1] in Case 1 described above with the curved line [I-2] and the curved line [II-2], and replaces the straight line [I-1] and the straight line [II-1] with the straight line [I-2] and the straight line [II-2]. Further, the contents described in Case 1 can also be applied to Case 2 by replacing the points P1-1, P2-1, P11-1, and P12-1 with the points P1-2, P2-2, P11-2, and P12-2. However, in the case of Case 1, the gas turbine inlet temperature GTIT of the data acquired in the combustion tolerance confirmation step S20 decreases due to the correction, and in order to maintain the decreased gas turbine inlet temperature GTIT at the initial inlet temperature, correction means for performing correction with the setting value conversion is applied. On the other hand, in the case of Case 2, the gas turbine inlet temperature GTIT increases due to the correction, and therefore, in order to maintain the increased gas turbine inlet temperature GTIT at the initial gas turbine inlet temperature, correction is performed with the setting value conversion, and in this regard, the correction means is different from the correction means in Case 1.

The specific contents of the correction means will be described below.

Expression 2 shown below is an expression for calculating the combustion load variable CLP corrected using the combustion load variable correction means in order to correct the deviation of the initial setting values of the combustion parameter PM and the combustion load variable CLP, with respect to Expression 1, and is composed of correction means for the combustion load variable correction step S40 (the maximum load correction step S50 and the setting value conversion step S70).

combustion load variable CLP(%)=[(turbine output (actual output)−no-load equivalent output)/ (planned maximum output−first correction coefficient×second correction coefficient−no-load equivalent output)]×100     [Expression 2]:

A first correction coefficient $156a$ and a second correction coefficient $157a$ are correction coefficients that are set in the combustion load variable correction step S40 (described later). The concepts of the planned maximum output and the no-load equivalent output are the same as those in Expression 1.

The first correction coefficient $156a$ is a correction coefficient for correcting the combustion load variable CLP in order to correct the deviation of the initial setting values of the combustion parameter PM and the combustion load variable CLP. The second correction coefficient $157a$ is a correction coefficient for correcting the combustion load variable CLP in order to correct the deviation of the setting values of the combustion parameter PM and the combustion load variable CLP, which is caused due to deterioration of the gas turbine, after the gas turbine 1 enters steady operation. The correction means corrects the combustion load variable CLP by multiplying the planned maximum output MOP by the first correction coefficient $156a$ and the second correction coefficient $157a$.

Figure 12:
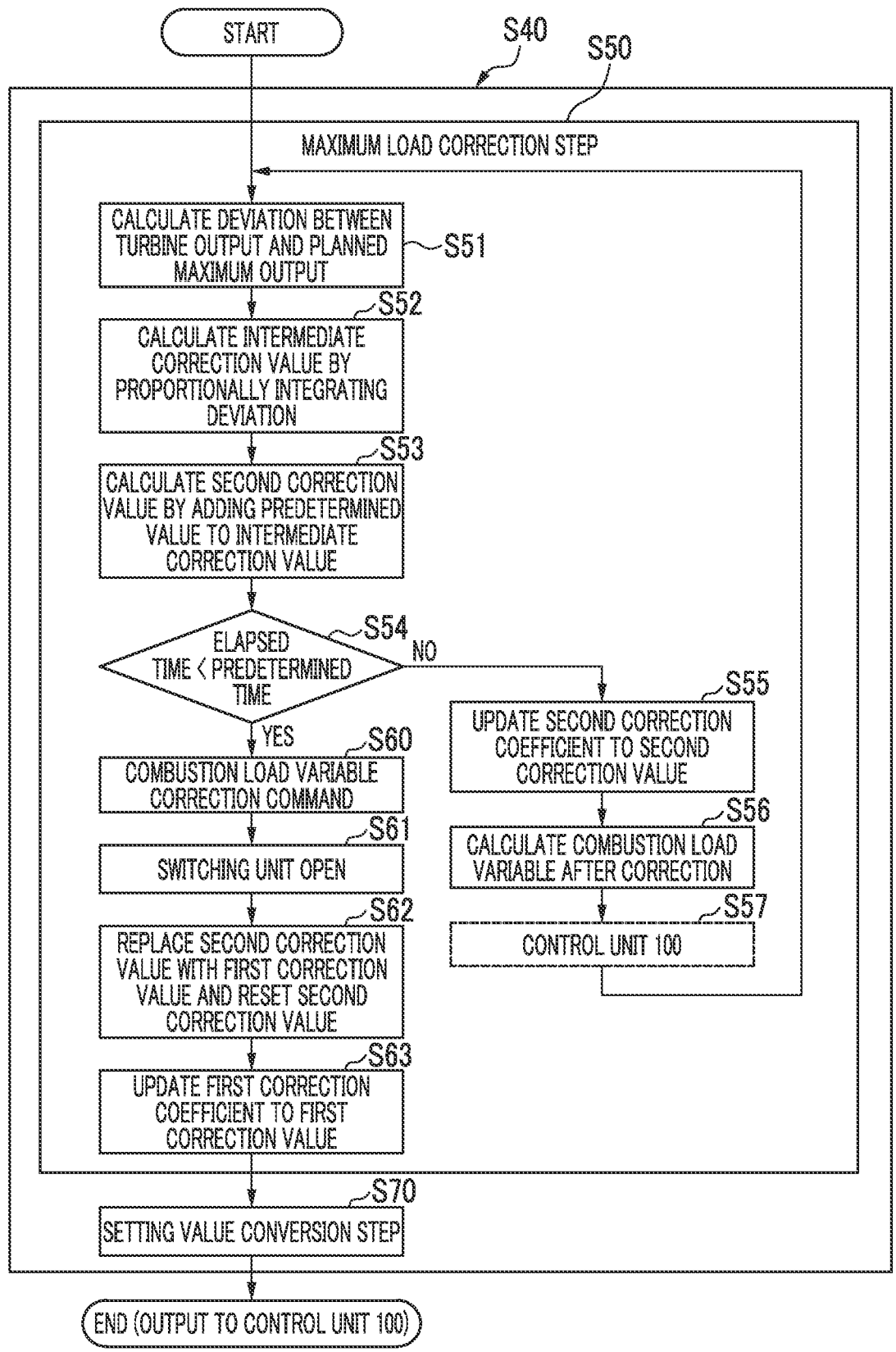
FIG. 12 is a flow chart showing a combustion load variable correction step.
Figure 13:
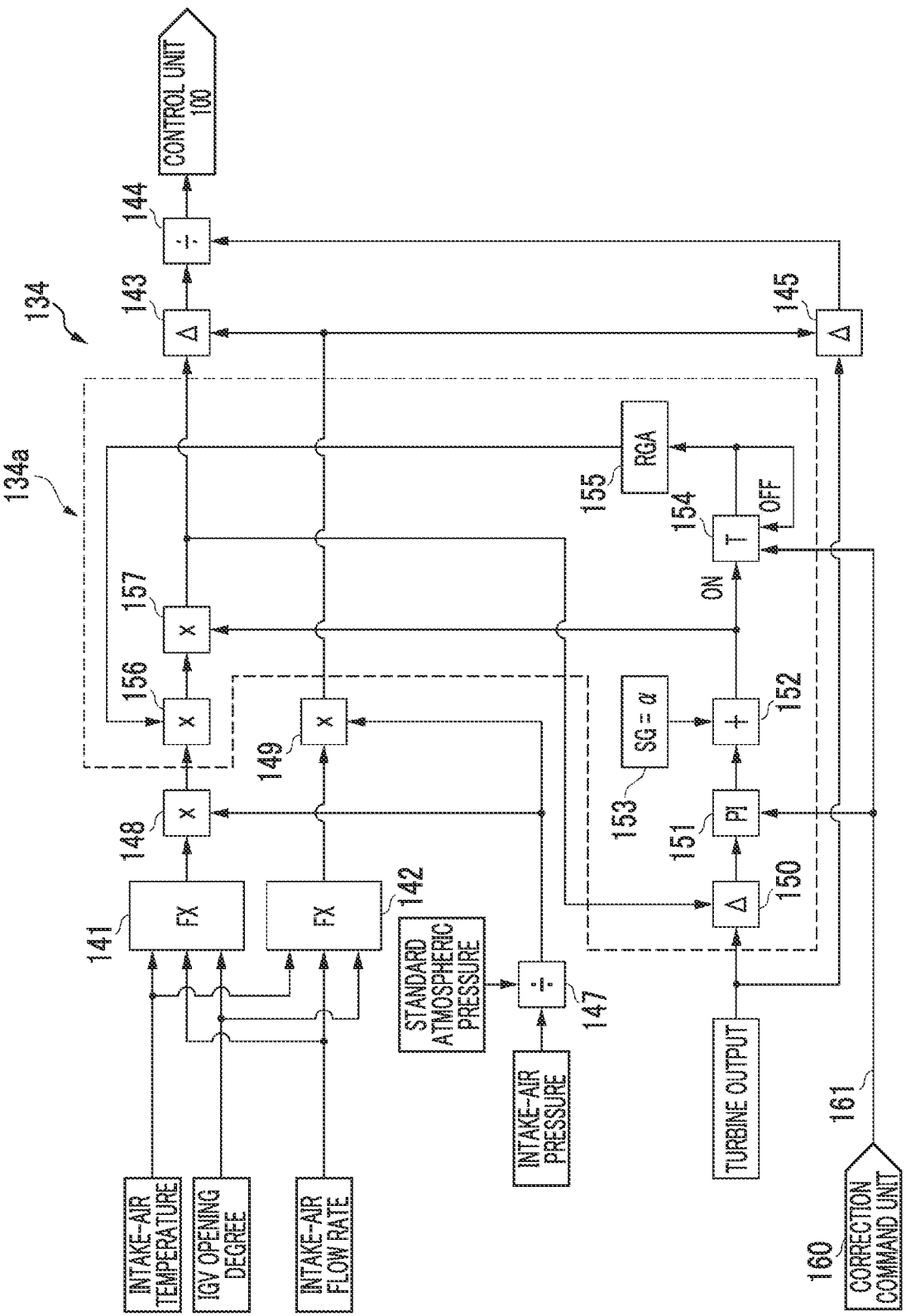
FIG. 13 is a logic diagram of a combustion load variable correction unit.

The correction means in the combustion load variable correction step S40 will be specifically described with reference to FIGS. 12 and 13. FIG. 12 is a flow chart showing the flow of work of the combustion load variable correction step S40. FIG. 13 shows a control logic diagram for calculating the corrected combustion load variable CLP expressed by Expression 2, and shows each configuration of the combustion load variable correction unit 134 that configures the correction means of the combustion load variable correction step S40.

Expression 2 is an expression for calculating the combustion load variable CLP including the first correction coefficient $156a$. However, in a case where the turbine output coincides with the planned maximum output MOP or the rated output, the combustion load variable CLP shown in Expression 2 coincides with that in Expression 1. In this case, the first correction coefficient $156a$ in Expression 2 is set to be "1" that is an initial value.

The combustion load variable correction step S40 shown in FIG. 12 includes the maximum load correction step S50 of correcting the combustion load variable CLP shown in Expression 2 such that the combustion load variable CLP with respect to the planned maximum output MOP becomes the rated value (100%), and the setting value conversion step S70 of converting the setting value of the combustion load variable CLP such that the relationship between the combustion parameter PM and the gas turbine inlet temperature GTIT is maintained, based on the corrected combustion load variable CLP.

As shown in FIG. 12, the combustion load variable correction step S40 calculates the deviation between the turbine output sent from the input unit 121 and the corrected planned maximum output that is output from a second maximum load multiplier 157 (described later) (S51). Next, an intermediate correction value $151a$ is calculated by proportionally integrating the calculated deviation (S52). A second correction value $152a$ is calculated by adding a predetermined value α to the calculated intermediate correction value $151a$. As the predetermined value α, 1.0 is usually selected. After starting the execution of the step of the maximum load correction step S50, it is determined whether or not a predetermined time has elapsed (S54). In a case where it is determined that the predetermined time has not elapsed, the second correction coefficient $157a$ shown in Expression 2 is updated to the second correction value 152*a* (S55). The combustion load variable CLP shown in Expression 2 is calculated based on the updated second correction coefficient 157*a* (S56), and the setting value of the combustion load variable CLP of each combustion parameter PM is transmitted to the control unit 110 (S57). A control signal is sent from the control unit 110 to the gas turbine 1, based on the setting value of the combustion load variable CLP after correction. The deviation between the turbine output, which is the actual output based on the setting value of the combustion load variable CLP after correction, and the planned maximum output is calculated (S51). A cycle including the calculation of the deviation between the turbine output and the planned maximum output after correction (S51), the calculation of the intermediate correction value 151*a* and the second correction value 152*a* based on the deviation (352, 353), the update of the second correction coefficient 157*a* to the second correction value 152*a* (355), the calculation of the combustion load variable CLP after correction (356), the transmission to the control unit 110 (357), and the like is repeated until a predetermined time elapses. By repeating these steps, the deviation between the turbine output and the planned maximum output gradually decreases.

Meanwhile, when the predetermined time has elapsed, a combustion load variable correction command 161 is issued from a correction command unit 160 (S60). When the combustion load variable correction command 161 is issued, a switching unit 154 is switched from a closed (OFF) state to an open (ON) state, and the second correction value 152*a* is input to the switching unit 154 (S61). The switching unit 154 is switched to the closed (OFF) state in a short time, and the second correction value 152*a* is replaced with the first correction value 154*a* (362). The second correction value 152*a* is reset to an initial value (S62). The first correction coefficient 156*a* shown in Expression 2 is updated to the first correction value 154*a* (S63). Through this step, the combustion load variable CLP shown in Expression 2 is acquired as a setting value of the combustion load variable CLP after correction, which allows output of the planned maximum output at the rated value (100%).

The setting value conversion step S70 corrects the gas turbine inlet temperature GTIT by using the first correction coefficient 156*a* such that the relationship between the combustion parameter PM and the gas turbine inlet temperature GTIT is maintained, based on the combustion load variable CLP after correction, and converts the setting value that determines the relationship between the combustion parameter and the combustion load variable CLP.

When the combustion load variable correction step S40 that includes the maximum load correction step S50 and the setting value conversion step S70 has ended, the deviation of the initial setting values of the combustion parameter PM and the corresponding combustion load variable CLP is eliminated, and proper combustion control of the combustor 3 becomes possible.

Next, the configuration and control logic of the combustion load variable correction unit 134 will be described based on FIG. 13. As shown in FIG. 13, a function generator 141, which is output calculating means for the planned maximum output, calculates the planned maximum output, based on the actually measured values of an intake-air temperature, an intake-air flow rate, and an IGV opening degree command value. Further, a function generator 142, which is output calculating means for the no-load equivalent output, calculates the no-load equivalent output, based on the actually measured values of the intake-air temperature, the intake-air flow rate, and the IGV opening degree command value. A divider 147 calculates an atmospheric pressure ratio by dividing the actually measured value of the intake-air pressure by a standard atmospheric pressure. A multiplier 148 multiplies the planned maximum output calculated by the function generator 141 and the atmospheric pressure ratio calculated by the divider 147 to calculate the planned maximum output taking into account the atmospheric pressure ratio. A multiplier 149 multiplies the no-load equivalent output calculated by the function generator 142 and the atmospheric pressure ratio calculated by the divider 147 to calculate the no-load equivalent output taking into account the atmospheric pressure ratio. A subtracter 145 performs subtraction by the turbine output sent from the input unit 121 and the no-load equivalent output that is output from the multiplier 149. Next, in a first maximum load multiplier 156 and a second maximum load multiplier 157, the planned maximum output shown in Expression 2 is corrected by the first correction coefficient 156*a* and the second correction coefficient 157*a*, which will be described later. In a subtracter 143, subtraction is performed from the planned maximum output after correction that is output from the second maximum load multiplier 157 and the no-load equivalent output that is output from the multiplier 149 (refer to Expression 2). In a divider 144, division is performed based on the calculation result of the subtracter 143 and the calculation result of the subtracter 145 to calculate the combustion load variable CLP after correction shown in Expression 2.

Next, the maximum load correction unit 134*a*, which configures a part of the combustion load variable correction unit 134 related to the correction of the planned maximum output, will be described. As shown in FIG. 3, the combustion load variable correction unit 134 includes the maximum load correction unit 134*a* and the setting value conversion unit 134*b*. The maximum load correction unit 134*a* is means for correcting the deviation of the initial setting value of the combustion parameter PM with respect to the combustion load variable CLP, and is shown in a range surrounded by a dashed line in FIG. 13. The maximum load correction unit 134*a* corresponds to the maximum load correction step 50, and the setting value conversion unit 134*b* corresponds to the setting value conversion step S70.

The maximum load correction unit 134*a* includes a subtracter 150 that calculates the deviation between the turbine output and the planned maximum output MOP after correction, a PI calculator 151 that calculates the intermediate correction value 151*a*, an adder 152 that calculates the second correction value 152*a* by adding the predetermined value α output from a signal generator 153 to the intermediate correction value 151*a*, the second maximum load multiplier 157 that receives the second correction value 152*a* output from the adder 152 and that updates the second correction value 152*a* instead of the existing value of the second correction coefficient 157*a*, the switching unit 154 that receives the second correction value 152*a*, based on the combustion load variable correction command 161 from the correction command unit 160, a data storage unit 155 that stores the second correction value 152*a* output from the switching unit 154 as a new first correction value 154*a*, and the first maximum load multiplier 156 that receives the first correction value 154*a* output from the data storage unit 155 and that updates the first correction value 154*a* instead of the existing value of the first correction coefficient 156*a*.

The turbine output input from the control unit 110 through the input unit 121 and the planned maximum output MOP after correction corrected by the second maximum load multiplier 157 are input to the subtracter 150. In the subtracter 150, the deviation between the turbine output and the planned maximum output MOP after correction is calculated. The deviation between the turbine output and the planned maximum output MOP after correction output from the subtracter 150 is input to the PI calculator 151. In the PI calculator 151, a proportional integral calculation is performed on the deviation between the turbine output and the planned maximum output MOP after correction, and the intermediate correction value 151a is calculated. The predetermined value input from the signal generator 153 is added to the generated intermediate correction value 151a in the adder 152, and the second correction value 152a is calculated. The second correction value 152a output from the adder 152 is input to the second maximum load multiplier 157. The second correction coefficient 157a of the second maximum load multiplier 157 shown in Expression 2 is updated to the second correction value 152a instead of the existing value. The planned maximum output after correction is calculated based on the updated second correction coefficient 157a. The planned maximum output after correction is input to the subtracter 143 and subtracted from the no-load equivalent output NOP input from the multiplier 149. In the divider 144, the combustion load variable CLP after correction shown in Expression 2 is calculated based on the calculation result from the subtracter 143 and the calculation result from the subtracter 145 and is output to the control unit 110.

Meanwhile, when the maximum load correction step S50 has started and a predetermined time has elapsed, it is determined that the deviation between the turbine output and the planned maximum output MOP after correction calculated by the subtracter 150 is within an allowable value of the output deviation, and the combustion load variable correction command 161 is issued. When the combustion load variable correction command 161 is input to the PI calculator 151 and to the switching unit 154, the signal of the combustion load variable correction command 161 is temporarily turned on, and the signal of the second correction value 152a output from the adder 152 is input to the data storage unit 155 and is stored as the first correction value 154a. The first correction value 154a is input from the data storage unit 155 to the first maximum load multiplier 156. In the first maximum load multiplier 156, the existing value of the first correction coefficient 156a shown in Expression 2 is updated to the first correction value 154a, and the planned maximum output MOP after correction is calculated based on the first correction coefficient 156a after update. Further, when the combustion load variable correction command 161 is input to the PI calculator 151, the second correction value 152a is reset and updated to the initial setting value. The switching unit 154 enters an open (ON) state, based on the combustion load variable correction command 161, and the period during which the first correction coefficient 156a of the first maximum load multiplier 156 is updated to the first correction value 154a is ended in a short time. After the switching unit 154 is switched to a closed (OFF) state, a circuit through which the signal of the second correction value 152a on an upstream side of the switching unit 154 enters the switching unit 154 is cut off. At the same time as when the switching unit 154 is switched to the closed (OFF) state, the second correction value 152a is reset and updated to the initial setting value (usually "1"). The second correction value 152a output from the adder 152 is updated to the initial setting value. However, the second correction value 152a after update is not input to the switching unit 154 and is sent to the second maximum load multiplier 157. Therefore, with respect to the first correction coefficient 156a that is input to the first maximum load multiplier 156, the second correction value 152a input when the switching unit 154 enters the open (ON) state in response to the combustion load variable correction command 161 is changed to the first correction value 154a, and the first correction value 154a is maintained as it is. The first correction value 154a input to the data storage unit 155 is stored in the data storage unit 155. However, the second correction value 152a when the switching unit 154 enters the open (ON) state in response to the combustion load variable correction command 161 is a value when the deviation between the turbine output and the planned maximum output MOP after correction is within an allowable value, and the second correction value 152a is stored in the data storage unit 155 as the first correction value 154a. As shown in Expression 2, since the first correction coefficient 156a has the purpose of performing correction on the planned maximum output by using the first correction coefficient 156a and the second correction coefficient 157a, and selecting a correction coefficient which allows the planned maximum output MOP to be output at the rated value (100%) of the combustion load variable CLP, the first correction coefficient 156a is updated to the first correction value 154a, and is maintained as it is even after transition to steady operation.

The setting value conversion unit 134b converts the setting value of the combustion load variable CLP after correction calculated by the maximum load correction unit 134a while the relationship between the combustion parameter PM and the gas turbine inlet temperature GTIT is maintained. That is, the deviation of the inlet temperature caused in the relationship between the combustion parameter PM and the gas turbine inlet temperature GTIT due to the correction by the maximum load correction unit 134a is corrected by the conversion of the setting value of the combustion load variable CLP in the setting value conversion unit 134b. Specifically, the gas turbine inlet temperature GTIT is divided by the first correction coefficient 156a to obtain a new gas turbine inlet temperature GTIT after correction. As a result of this conversion, as the relationship between the combustion parameter PM and the gas turbine inlet temperature GTIT, the relationship between the combustion parameter PM and the gas turbine inlet temperature GTIT at the time of the confirmation of the combustion tolerance range is maintained.

The combustion load variable CLP is calculated based on Expression 2 including the first correction coefficient 156a updated to the first correction value 154a selected by the maximum load correction unit 134a, and the planned maximum output MOP after correction is calculated. With respect to the second correction coefficient 157a updated to the second correction value 152a, the second correction value 152a is reset to the initial setting value (usually "1") in response to the combustion load variable correction command 161, and therefore, the second correction coefficient 157a also returns to the initial setting value. The combustion load variable before correction is replaced with the combustion load variable CLP after correction based on Expression 2 and is transmitted to the control unit 110. In response to the combustion load variable correction command 161, the first correction coefficient 156a of the first maximum load multiplier 156 is updated to the first correction value 154a selected under the condition that the planned maximum output and the turbine output approximately coincide with each other, and the second correction coefficient 157a is transmitted to the control unit 110 with the initial setting value unchanged. The combustion load variable CLP shown in Expression 2 is replaced with a setting value at which the planned maximum output MOP is output at the rated value (100%) of the combustion load variable CLP. Therefore, in the combustion control of the combustor 3 after the correction, the deviation of the initial setting value of the combustion load variable CLP is eliminated, and a state where proper combustion control is possible is created.

As described above, at the time of a trial run or at the time of restarting operation after the completion of regular inspection, in the maximum load correction step S50, in order to eliminate the deviation of the initial setting value, the correction means for correcting the planned maximum output by using the first correction coefficient 156a to output the planned maximum output at the rated value (100%) of the combustion load variable CLP is applied. After the correction, the gas turbine 1 enters steady operation. However, even after entering the steady operation, the deviation between the planned maximum output and the actual output occurs along with the deterioration of the gas turbine 1. In such a case, in order to eliminate the deviation of the setting value ST, the correction of the planned maximum output shown in Expression 2 is performed based on the same concept. However, in the steady operation, the correction means for the deviation of the setting value ST of the combustion load variable CLP due to the deterioration of the gas turbine 1 is slightly different from the correction means described above, and in the maximum load correction step S50 shown in FIG. 12, a learning circuit is applied in which processing of repeating steps S51 to S57 excluding step S54 is executed. By repeating this processing, the deviation of the setting values ST of the planned maximum output MOP and the combustion load variable CLP is automatically eliminated. That is, the first correction coefficient 156a selected by the correction performed at the time of a trial run or at the time of start-up after the completion of regular inspection is maintained as it is, and the deviation of the setting values ST of the planned maximum output MOP and the combustion load variable CLP is corrected using the second correction coefficient 157a.

As described above, in the step of correcting the initial setting value of the combustion load variable CLP of the combustion parameter PM at the time of the start of a trial run of the gas turbine 1 or at the time of restarting operation after regular inspection, until the deviation between the turbine output and the planned maximum output falls within an allowable value, the planned maximum output is corrected using the second correction coefficient 157a, the planned maximum output MOP after correction is calculated, and the combustion load variable CLP after correction is calculated. At that time, the first correction coefficient 156a is fixed at the previous setting value. Meanwhile, after the deviation between the turbine output and the planned maximum output falls within an allowable value and the deviation of the initial setting value is corrected, the gas turbine 1 enters the steady operation. In a case where the gas turbine 1 enters the steady operation, the deviation of the setting values ST of the combustion parameter PM and the combustion load variable CLP occurs due to the deterioration of the gas turbine 1. However, the first correction coefficient 156a is fixed to a new setting value updated to the first correction value 154a, and the second correction coefficient 157a is updated until the deviation between the turbine output and the planned maximum output MOP falls within an allowable value. Due to the update of the second correction coefficient 157a, the planned maximum output MOP is corrected, and the combustion load variable CLP is automatically corrected.

In a formula for calculation of the combustion load variable CLP shown in Expression 2, as correction means, the planned maximum output is multiplied by the first correction coefficient 156a and the second correction coefficient 157a. The reason for applying two correction coefficients is for selecting the optimum first correction coefficient 156a by updating the first correction coefficient 156a and the second correction coefficient 157a, at the time of initial setting at the time of the start of a trial run and at the time of the restart of operation after regular inspection, for selecting the optimum first correction coefficient 156a, and for selecting the optimum second correction coefficient 157a by fixing the first correction coefficient 156a and updating only the second correction coefficient 157a, at the time of the steady operation. The reason for changing the method of correcting the combustion load variable CLP between the time of initial setting at the time of the start of a trial run and at the time of the restart of operation after regular inspection, and the time of the steady operation is for enabling long-term operation of the gas turbine by correcting the deviation of the setting value at the time of initial setting and automatically correcting the deviation of the setting value due to GT deterioration at the time of the steady operation.

In a case of entering the steady operation by executing only steps S51 to S57 without applying all the steps of the maximum load correction step S50 shown in FIG. 12 and omitting the steps after step S60, there is a possibility that combustion adjustment is adversely affected. That is, this is because the steady operation is started without eliminating the deviation of the initial setting value of the combustion load variable CLP, so that a proper relationship between the GT load and the combustion load variable CLP is not maintained.

<<Setting Value Change Step>>

As shown in FIG. 8, the setting value change step S30 is a step of changing the setting values of the combustion parameter PM and the combustion load variable CLP in a case where the origin shift occurs in the combustion tolerance confirmation step S20. The setting value change step S30 is executed after the combustion tolerance confirmation step S20 is executed and before the combustion load variable correction step S40 is executed.

As described above, the setting value change step S30 is a step of changing the setting value of the combustion load variable CLP of the combustion parameter PM in a case where the origin shift occurs in the combustion tolerance confirmation step S20. The setting value change step S30 is a step of automatically correcting the combustion parameter PM in a case where the origin shift occurs as a result of the combustion tolerance confirmation step S20 with respect to the combustion parameters PM that determine the setting values of the combustion parameters PM (the pilot ratio PL, the top hat ratio TH, and the bypass valve opening degree BV) with respect to the combustion load variable CLP. Specifically, it means that with respect to each combustion parameter PM, in a case where the origin shift occurs with respect to each combustion parameter PM before the combustion tolerance confirmation, in the setting value of the combustion parameter PM with respect to a predetermined combustion load variable CLP, the position of the origin OP is changed according to a setting value changing method, which will be described later, and the setting value ST of the combustion load variable CLP of the combustion parameter PM is corrected.

By changing the setting value ST of each combustion parameter PM by reflecting the result of the combustion tolerance confirmation step S20, a proper setting value ST of the combustion parameter PM with respect to the combustion load variable CLP is selected, and the setting of the combustion parameter PM in which the occurrence of combustion oscillation can be suppressed becomes possible.

Figure 14:
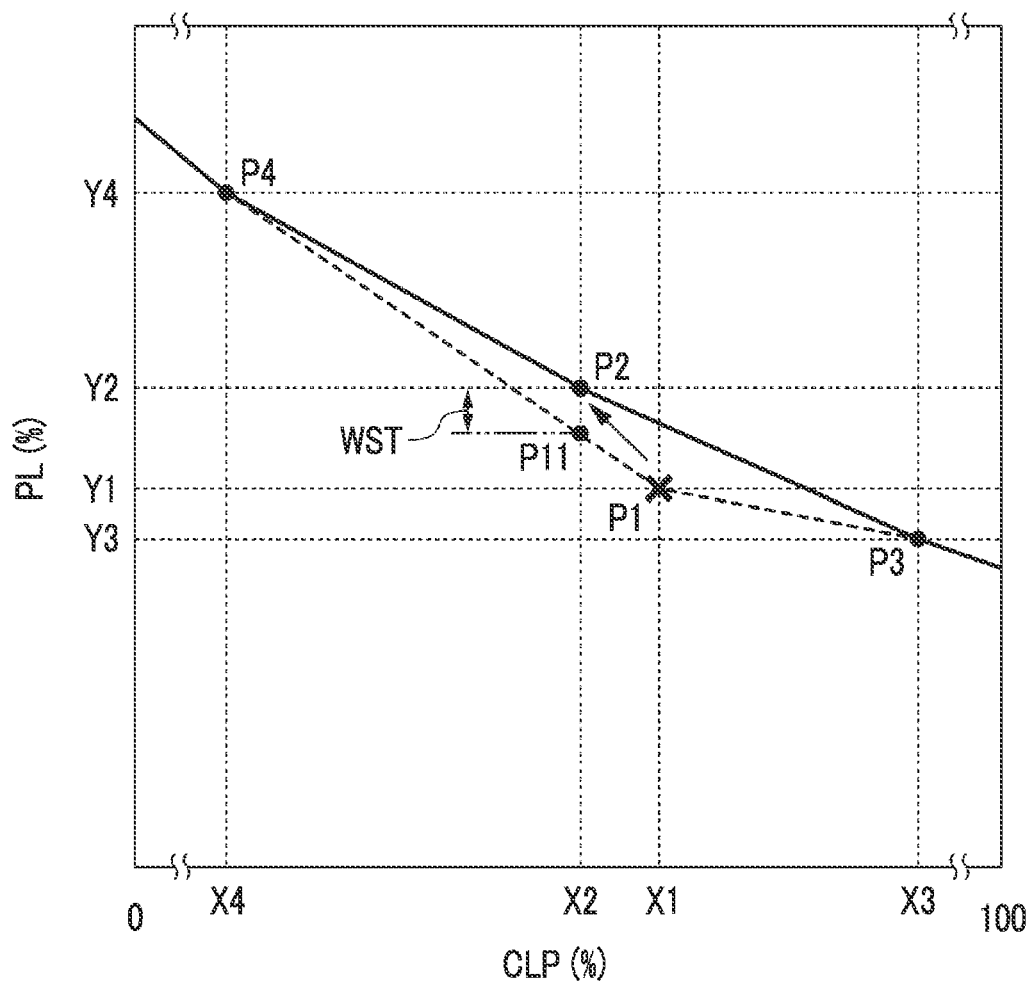
FIG. 14 is a schematic diagram showing an example of a setting value change.

FIG. 14 is a diagram showing an example of changing the setting value ST of the pilot ratio PL among the combustion parameters PM, as an example of a setting value changing method. The horizontal axis represents the combustion load variable CLP, and the vertical axis represents the pilot ratio PL (%). In the combustion tolerance confirmation step S20, the combustion load variable CLP corresponding to a predetermined GT load is selected, and the setting of the combustion tolerance range is executed.

In FIG. 14, the position of the origin OP before the execution of the combustion tolerance confirmation step S20 is indicated by a point P1, and a point P2 indicates the position of the new origin NOP after the origin shift shown by an arrow occurs and the origin OP is moved, as a result of the combustion tolerance confirmation step S20. That is, in FIG. 14, the point P1 indicating the position of the origin OP is shown at the position where the combustion load variable CLP is X1(%) and the pilot ratio PL is Y1(%), and the point P2, which is the new origin NOP, is shown at the position where the combustion load variable CLP is X2(%) and the pilot ratio PL is Y2(%). In the present example, for example, as a result of the combustion tolerance confirmation shown in the example of FIG. 7, the origin shift occurs in the direction in which the pilot ratio PL increases in FIG. 14, and therefore, X1, which is the combustion load variable CLP at the original point P1, is changed to X2, which is a new combustion load variable in a decreasing direction.

In the present embodiment, as shown in FIG. 14, points P3 and P4 are adjacent to the point P1 and include the point P3 on the side where the combustion load variable CLP increases and the point P4 on the side where the combustion load variable CLP decreases. The positions indicated by the points P1 to P4 and the like show the positions corresponding to the GT loads that are selected in the GT load setting step S22 in the combustion tolerance confirmation step S20 shown in FIG. 9. FIG. 14 is an example in which as a result of the combustion tolerance confirmation, the origin shift does not occur at the positions of the points P3 and P4 and the origin shift occurs near the position of the point P1 interposed between the points P3 and P4. A line segment passing through the points P3, P1, and P4 showing the relationship between the pilot ratio PL and the combustion load variable CLP immediately before the origin shift occurs at the point P1 is shown by a dashed line. The relationship between the pilot ratio PL and the combustion load variable CLP in a case where the origin OP is changed to the new origin NOP due to the occurrence of the origin shift at the point P1 is shown by a solid line passing through the points P3, P2, and P4. The position of a point P11 where the line segment P1P4 shown by a dashed line intersects the vertical axis passing through X2 of the combustion load variable CLP is the position where due to the occurrence of the origin shift, the original origin OP is moved from the origin OP along the line segment P1P4 by an amount corresponding to the decrement (from X1 to X2) of the combustion load variable CLP. The position obtained by adding an origin movement width WST to the pilot ratio PL (%) at the point P11 corresponds to the position of the point P2 after the origin shift.

From a different point of view, the point P1 where the combustion load variable CLP is X1(%) and the pilot ratio PL is Y1(%), which is the position of the origin OP before the combustion tolerance confirmation, is the origin setting value which is an initial target. However, in the actual combustion tolerance confirmation step S20, it is difficult to accurately set a target origin position, and the actual origin position is slightly shifted from the position of the point P1, which is a target origin position, to the position of the point P11. Therefore, the position of the point P11 may be considered as an example in which the combustion tolerance confirmation is executed as the position of the origin at the time of actual operation. It can be regarded as an example in which the combustion tolerance confirmation is performed at the position of the point P11, which is the origin at the time of operation, and the origin position is moved to the position of the point P2, which is the origin movement width WST.

Therefore, the point P11, which is the position closest to the origin P1 which is an initial origin position that is an original target, is set as the origin at the time of operation, and in the setting value change step S30 in a case where the origin shift occurs due to the execution of the combustion tolerance confirmation step S20, the combustion load variable CLP, which is closest to the initial origin setting value, is set as the origin at the time of operation, and the combustion tolerance confirmation step S20 is executed. In a case where the setting value ST of the initial origin OP is changed and the new origin NOP is set, it is favorable if the setting value ST of the initial origin OP is changed to the setting value ST of the new origin NOP.

Therefore, in the combustion tolerance confirmation step S20, in a case where the origin shift occurs at the origin P1 (where the pilot ratio PL is Y1(%) and the combustion load variable CLP is X1(%)), with respect to the position of the new origin NOP after movement, the position of the point P2 in FIG. 14 can be determined by selecting the position of "X2", which is the combustion load variable CLP, and the origin movement width WST of the pilot ratio PL from the result of the combustion tolerance confirmation step S20. According to this procedure, in a case where the origin shift occurs, a setting value change to change the position of the point P1, which is the origin OP, to the position of the point P2, which is the new origin NOP, becomes possible.

The contents described in the embodiments described above or shown in the drawings are not intended to limit the scope of the invention, but are merely explanatory examples. Further, the expressions "being provided with", "comprising", "including", or "having" one component are not exclusive expressions excluding the presence of other components.

The contents described in each of the embodiments described above are understood as follows.

(1) A combustion adjustment method of a gas turbine according to a first aspect is a combustion adjustment method, which is applied to combustion control of a combustor, the method including: a step of selecting a combustion parameter for setting a fuel-air ratio with respect to a load of the gas turbine; a step of executing a first step that includes a first increase command step, which is an increase command step of increasing a command value of the combustion parameter, or a first decrease command step, which is a decrease command step of decreasing the command value, from a position of an origin; a step of ending the first step and returning the command value of the combustion parameter to the position of the origin, when the command value reaches a target tolerance upper limit value or a target tolerance lower limit value without occurrence of combustion oscillation in the combustor; a step of executing a second step that includes a second decrease command step, which is a decrease command step of decreasing the command value in a direction opposite to that in the first step from the position of the origin, or a second increase command step, which is an increase command step of increasing the command value; and a step of ending the second step and returning the command value of the combustion parameter in the second step to the position of the origin, when the command value in the second step reaches the target tolerance lower limit value or the target tolerance upper limit value without occurrence of combustion oscillation in the combustor, in which the method further comprises a combustion tolerance confirmation step of confirming a combustion tolerance range of the combustion parameter.

According to the combustion adjustment method of a gas turbine described in the above (1), since the combustion tolerance range in the direction of increasing or the direction of decreasing the command value of the combustion parameter with the origin position as a reference can be confirmed in advance, stable combustion control of the gas turbine becomes possible without the occurrence of combustion oscillations, and the reliability of the gas turbine is improved.

(2) In a combustion adjustment method of a gas turbine according to a second aspect, in the combustion adjustment method of a gas turbine of the above (1), the combustion tolerance confirmation step is a step of confirming the combustion tolerance range of a first combustion parameter of the combustion parameters, and the origin, the command value, the target tolerance upper limit value, and the target tolerance lower limit value of the first combustion parameter are a first origin, a first command value, a first target tolerance upper limit value, and a first target tolerance lower limit value.

According to the combustion adjustment method of a gas turbine described in the above (2), since the tolerance range of the combustion oscillation of the combustion parameter with a high degree of priority can be confirmed preferentially, the work for the tolerance confirmation of the combustion oscillation can be shortened, and the start-up time of the gas turbine can be shortened.

(3) In a combustion adjustment method of a gas turbine according to a third aspect, in the combustion adjustment method of a gas turbine of the above (2), the combustion tolerance confirmation step is a step of confirming the combustion tolerance range of a second combustion parameter of the combustion parameters, and the origin, the command value, the target tolerance upper limit value, and the target tolerance lower limit value of the second combustion parameter are a second origin, a second command value, a second target tolerance upper limit value, and a second target tolerance lower limit value.

(4) In a combustion adjustment method of a gas turbine according to a fourth aspect, in the combustion adjustment method of a gas turbine of the above (3), the combustion tolerance confirmation step is a step of confirming the combustion tolerance range of a third combustion parameter of the combustion parameters, and the origin, the command value, the target tolerance upper limit value, and the target tolerance lower limit value of the third combustion parameter are a third origin, a third command value, a third target tolerance upper limit value, and a third target tolerance lower limit value.

(5) In a combustion adjustment method of a gas turbine according to a fifth aspect, the combustion adjustment method of a gas turbine of any one of the above (1) to (4) further includes: a combustion load variable correction step that includes a maximum load correction step of correcting a setting value of a combustion load variable for which the combustion tolerance range of the acquired combustion parameter is confirmed, such that the combustion load variable with respect to planned maximum output becomes a rated value, and a setting value conversion step of converting the setting value of the combustion load variable calculated in the maximum load correction step while maintaining a relationship between the combustion parameter and a gas turbine inlet temperature.

According to the combustion adjustment method of a gas turbine described in the above (5), since an appropriate relationship between the combustion parameter and the combustion load variable is set by confirming the combustion adjustment range of the combustion parameter and correcting the setting value of the combustion parameter, appropriate combustion control of the combustor becomes possible.

(6) In a combustion adjustment method of a gas turbine according to a sixth aspect, in the combustion adjustment method of a gas turbine of any one of the above (1) to (5), the combustion tolerance confirmation step is executed in response to the combustion load variable indicating a load of the gas turbine.

According to the combustion adjustment method of a gas turbine described in the above (6), since the combustion tolerance confirmation is performed based on the combustion load variable corresponding to the GT load, it is easy to predict the occurrence of combustion oscillation.

(7) In a combustion adjustment method of a gas turbine according to a seventh aspect, in the combustion adjustment method of a gas turbine of any one of the above (1) to (6), the combustion tolerance confirmation step includes a step of selecting the degree of priority of the combustion parameter and the degree of priority of a change pattern of the command value of the combustion parameter in response to a combustion load variable indicating a load of the gas turbine.

According to the combustion adjustment method of a gas turbine described in the above (7), since the degree of priority of the combustion parameter and the degree of priority of the change pattern of the command value of the combustion parameter can be selected corresponding to the combustion load variable, the combustion tolerance confirmation of the combustion parameters in which combustion oscillation easily occurs can be preferentially executed, and therefore, the backtracking of the combustion tolerance confirmation is reduced, and the combustion tolerance confirmation work is shortened.

(8) In a combustion adjustment method of a gas turbine according to an eighth aspect, in the combustion adjustment method of a gas turbine of any one of the above (1) to (7), when the command value is returned to the position of the origin after the first step or the second step has ended, the command value is decreased or increased at a first predetermined rate.

According to the combustion adjustment method of a gas turbine described in the above (8), after the increase command step or the decrease command step of the first step or the second step has ended, it is possible to return to the origin position at the first predetermined rate, so that the combustion tolerance confirmation step is shortened.

(9) In a combustion adjustment method of a gas turbine according to a ninth aspect, in the combustion adjustment method of a gas turbine of any one of the above (1) to (8), the increase command step or the decrease command step of the first step or the second step includes a step of increasing or decreasing the command value along a stepped stage from the position of the origin, and a step of maintaining a first retention time without the occurrence of combustion oscillation in the stage after the command value is increased or decreased by one stage.

According to the combustion adjustment method of a gas turbine described in the above (9), since there is a time delay in the occurrence of combustion oscillation with respect to the command value, the presence or absence of the occurrence of combustion oscillation at the command value can be reliably determined by maintaining the first retention time after reaching a predetermined setting value in each stage, and since the command value is increased or decreased while confirming the presence or absence of the occurrence of combustion oscillation, the combustion oscillation range of the combustion parameter can be confirmed more reliably.

(10) In a combustion adjustment method of a gas turbine according to a tenth aspect, in the combustion adjustment method of a gas turbine of the above (9), the increase command step or the decrease command step of the first step or the second step includes a step of increasing or decreasing the command value at a second predetermined rate when the command value is increased or decreased by one stage.

According to the combustion adjustment method of a gas turbine described in the above (10), depending on a combustor, there is a region in which combustion oscillation does not easily occur, and therefore, by increasing a command value change speed in such a region, the combustion tolerance confirmation work is shortened.

(11) In a combustion adjustment method of a gas turbine according to an eleventh aspect, in the combustion adjustment method of a gas turbine of any one of the above (9) or (10), the increase command step or the decrease command step of the first step or the second step includes a step of collecting steady data while maintaining a second retention time from a point in time when the first retention time has elapsed at the command value, in a case where the command value is maintained at the stage where the command value reaches the target tolerance upper limit value or the target tolerance lower limit value, and the first retention time is reached at the stage without occurrence of combustion oscillation.

According to the combustion adjustment method of a gas turbine described in the above (11), in a case where combustion oscillation does not occur even if the first retention time is reached at the setting value of the combustion tolerance upper limit value or the combustion tolerance lower limit value, it is determined that the combustion tolerance range in the increase command step or the decrease command step is confirmed, and therefore, the steady data of the gas turbine is collected while maintaining the second retention time, data is accumulated in the automatic combustion adjustment unit, and appropriate combustion adjustment operation becomes possible.

(12) In a combustion adjustment method of a gas turbine according to a twelfth aspect, in the combustion adjustment method of a gas turbine of any one of the above (1) to (10), the combustion tolerance confirmation step includes a step of setting the command value of the stage immediately before combustion oscillation occurs as an actual tolerance upper limit value, returning the command value to the position of the origin, and ending the first step, in a case where in the increase command step of the first step, combustion oscillation occurs before the command value of the combustion parameter reaches the target tolerance upper limit value, or in a case where combustion oscillation occurs after the command value of the combustion parameter reaches a stage that is the target tolerance upper limit value and before the first retention time is reached at the command value, a step of calculating a difference between the number of stages between the position of the origin and the target tolerance upper limit value and the number of stages between the position of the origin and the actual tolerance upper limit value in the increase command step of the first step, in the decrease command step of the second step in a direction opposite to that in the increase command step of the first step, and setting a value obtained by adding the difference in the command value corresponding to the difference in the number of stages of the first step in a direction of decreasing the command value in the second step to the target tolerance lower limit value in the decrease command step of the second step, as an actual tolerance lower limit value, a step of executing the decrease command step from the position of the origin of the decrease command step of the second step to the actual tolerance lower limit value without occurrence of combustion oscillation at the command value of the combustion parameter, and a step of setting a new origin at a position moved by the difference in the number of stages in the first step in the direction of decreasing the command value in the second step with respect to the position of the origin.

According to the combustion adjustment method of a gas turbine described in the above (12), According to the combustion adjustment method of a gas turbine described in the above (12), even if combustion oscillation occurs in the increase command step of the first step, the position of the origin is moved to the position of the new origin, which is in a direction of decreasing the command value, and the new origin is set at the intermediate position of the target tolerance width between the actual tolerance upper limit value, which is an upper limit at which combustion oscillation does not occur in the direction of increasing the command value from the position of the new origin, and the actual tolerance lower limit value, which is a lower limit at which combustion oscillation does not occur in the direction of decreasing the command value, and therefore, a stable operating range in which combustion oscillation does not occur can be secured.

(13) In a combustion adjustment method of a gas turbine according to a thirteenth aspect, in the combustion adjustment method of a gas turbine of any one of the above (1) to (10), the combustion tolerance confirmation step includes a step of setting the command value of the stage immediately before combustion oscillation occurs as an actual tolerance lower limit value, returning the command value to the position of the origin, and ending the first step, in a case where in the decrease command step of the first step, combustion oscillation occurs before the command value of the combustion parameter reaches the target tolerance lower limit value, or in a case where combustion oscillation occurs after the command value of the combustion parameter reaches a stage that is the target tolerance lower limit value and before the first retention time is reached at the command value, a step of calculating a difference between the number of stages between the position of the origin and the target tolerance lower limit value and the number of stages between the position of the origin and the actual tolerance lower limit value in the decrease command step of the first step, in the increase command step of the second step in a direction opposite to that in the decrease command step of the first step, and setting a value obtained by adding the difference in the command value corresponding to the difference in the number of stages of the first step in a direction of increasing the command value in the second step to the target tolerance upper limit value in the increase command step of the second step, as an actual tolerance upper limit value, a step of executing the increase command step from the position of the origin to the actual tolerance upper limit value without occurrence of combustion oscillation at the command value of the combustion parameter, in the increase command step of the second step, and a step of setting a new origin at a position moved by the difference in the number of stages in the first step in the direction of increasing the command value in the second step with respect to the position of the origin.

According to the combustion adjustment method of a gas turbine described in the above (13), even if combustion oscillation occurs in the decrease command step of the first step, the position of the origin is moved to the position of the new origin, which is a direction in which the command value is increased, and the new origin is set at the intermediate position of the target tolerance width without changing the target tolerance width between the actual tolerance upper limit value, which is an upper limit at which combustion oscillation does not occur in the direction of increasing the command value from the position of the new origin, and the actual tolerance lower limit value, which is a lower limit at which combustion oscillation does not occur in the direction of decreasing the command value, and therefore, a stable operating range in which combustion oscillation does not occur can be secured.

(14) In a combustion adjustment method of a gas turbine according to a fourteenth aspect, in the combustion adjustment method of a gas turbine of any one of the above (9) or (10), the combustion tolerance confirmation step includes a step of executing the increase command step or the decrease command step of the first step from the position of the origin, setting the command value of the stage immediately before combustion oscillation occurs as an actual tolerance upper limit value or an actual tolerance lower limit value, and setting the actual tolerance upper limit value or the actual tolerance lower limit value as a first setting value in the first step, in a case where combustion oscillation occurs before the command value of the stage reaches the target tolerance upper limit value or the target tolerance lower limit value, or in a case where combustion oscillation occurs after the command value of the stage reaches the target tolerance upper limit value or the target tolerance lower limit value and before the first retention time is reached, executing the decrease command step or the increase command step of the second step in a direction opposite to that in the increase command step or the decrease command step of the first step from the position of the origin, setting the command value of the stage immediately before the combustion oscillation occurs as the actual tolerance lower limit value or the actual tolerance upper limit value in the second step, and setting the actual tolerance upper limit value or the actual tolerance lower limit value in the second step as a second setting value in the second step, in a case where combustion oscillation occurs before the command value of the stage reaches the target tolerance lower limit value or the target tolerance upper limit value, or in a case where combustion oscillation occurs after the command value of the stage reaches the target tolerance lower limit value or the target tolerance upper limit value and before the first retention time is reached, and setting a middle position between the first setting value and the second setting value as a new origin.

According to the combustion adjustment method of a gas turbine described in the above (14), since the position of the origin is moved to the intermediate position between the actual tolerance upper limit value or the actual tolerance lower limit value, which is an upper limit or a lower limit at which combustion oscillation does not occur in the increase command step or the decrease command step of the first step, and the actual tolerance lower limit value or the actual tolerance upper limit value, which is a lower limit or an upper limit at which combustion oscillation does not occur in the decrease command step or the increase command step of the second step, and the middle point is set as the new origin, even if combustion oscillation occurs in both steps of the increase command step and the decrease command step of the first and second steps, a stable operating range in which combustion oscillation does not occur can be secured.

(15) In a combustion adjustment method of a gas turbine according to a fifteenth aspect, in the combustion adjustment method of a gas turbine of any one of the above (12) to (14), the combustion tolerance confirmation step includes a step of collecting steady data while maintaining the second retention time from a point in time when combustion oscillation occurs, at the command value that is one stage lower or one stage higher than the command value at which combustion oscillation occurs, in a case where combustion oscillation occurs in the increase command step or the decrease command step of the first step or the second step and the position of the new origin is selected by moving the position of the origin.

According to the combustion adjustment method of a gas turbine described in the above (15), since steady data is collected while maintaining the second retention time at the command value that is one stage higher or lower than the command value at which combustion oscillation occurs, stable operating conditions in which combustion oscillation does not occur are accumulated, and the reliability of combustion control of the gas turbine is improved.

(16) In a combustion adjustment method of a gas turbine according to a sixteenth aspect, in the combustion adjustment method of a gas turbine of any one of the above (12) to (15), the combustion tolerance confirmation step includes a setting value change step of setting a combustion load variable closest to the setting value of the initial origin as an origin at a time of operation and executing the combustion tolerance confirmation step, and changing the setting value of the initial origin to the setting value of the new origin in a case where the setting value of the initial origin is changed and the new origin is set.

According to the combustion adjustment method of a gas turbine described in the above (16), in a case where the origin shift occurs in the combustion tolerance confirmation step, an appropriate relationship between the setting value of the combustion parameter and the combustion load variable is selected by changing the setting value of the origin, and therefore, it becomes possible to select the combustion parameter that can suppress the occurrence of combustion oscillation.

(17) In a combustion adjustment method of a gas turbine according to a seventeenth aspect, in the combustion adjustment method of a gas turbine of the above (5), the maximum load correction step includes a step of calculating a second correction value by calculating an intermediate correction value by proportionally integrating a deviation between turbine output and the planned maximum output, and adding a predetermined value to the intermediate correction value, a step of issuing a combustion load variable correction command when an elapsed time has elapsed a predetermined time after execution of the combustion load variable correction step has started, a step of replacing the second correction value with a first correction value via a switching unit, based on the combustion load variable correction command, and a step of resetting the second correction value, and a step of updating a first correction coefficient to the first correction value, based on the combustion load variable correction command.

According to the combustion adjustment method of a gas turbine described in the above (17), by executing the maximum load correction step, it is possible to acquire the setting value at which the planned maximum output is obtained at a combustion load variable of 100%.

(18) In a combustion adjustment method of a gas turbine according to an eighteenth aspect, in the combustion adjustment method of a gas turbine of the above (17), the maximum load correction step further includes a step of updating a second correction coefficient to the second correction value.

According to the combustion adjustment method of a gas turbine described in the above (18), deviation of the setting value due to GT deterioration at the time of steady operation in addition to the time of the start of a trial run and the time of initial setting after regular inspection is also corrected, and long-term operation of the gas turbine becomes possible.

(19) In a combustion adjustment method of a gas turbine according to a nineteenth aspect, in the combustion adjustment method of a gas turbine of any one of the above (17) or (18), in the setting value conversion step, the gas turbine inlet temperature is corrected based on the first correction coefficient.

According to the combustion adjustment method of a gas turbine described in the above (19), since the gas turbine inlet temperature is corrected based on the first correction coefficient, an appropriate relationship between the combustion parameters and the gas turbine inlet temperature is maintained.

(20) A combustion control device of a gas turbine according to a twentieth aspect includes: a control unit that controls an operating state of the gas turbine; an automatic combustion adjustment unit that controls combustion oscillation; and a combustion tolerance adjustment unit that determines a combustion tolerance range of a combustion parameter in which combustion oscillation does not occur with respect to a load of the gas turbine, and sends the determined combustion tolerance range to the automatic combustion adjustment unit.

According to the combustion control device of a gas turbine described in the above (20), since the device has the combustion tolerance adjustment unit that can select the combustion tolerance range in which combustion oscillation does not occur, the combustion adjustment work is automated, and the burden on a worker is reduced.

(21) In a combustion control device of a gas turbine shown in a twenty-first aspect, in the combustion control device of a gas turbine of the above (20), the combustion tolerance adjustment unit includes a combustion tolerance confirmation unit that confirms a combustion tolerance range of the combustion parameter according to a load of the gas turbine, a combustion load variable correction unit that corrects a combustion load variable with respect to the combustion parameter and that sets a new setting value, and a setting value change unit that corrects, in a case where a new origin is set in the combustion tolerance confirmation unit, a relationship between the combustion parameter and the combustion load variable, based on the new origin.

(22) In a combustion control device of a gas turbine shown in a twenty-second aspect, in the combustion control device of a gas turbine of the above (21), the combustion load variable correction unit includes a maximum load correction unit for correcting the combustion load variable, which is provided with a first correction coefficient for correcting the combustion load variable such that the combustion load variable with respect to planned maximum output becomes a rated value, and in which the first correction coefficient is updated to a first correction value calculated such that a deviation between turbine output and the planned maximum output falls within an allowable value, and a setting value conversion unit that corrects a gas turbine inlet temperature, based on the first correction coefficient, so as to maintain a relationship between the combustion parameter and the gas turbine inlet temperature, based on the combustion load variable after correction.

(23) In a combustion control device of a gas turbine shown in a twenty-third aspect, in the combustion control device of a gas turbine of the above (22), the maximum load correction unit includes a subtracter that calculates a deviation between the turbine output and the planned maximum output, a PI calculator that calculates an intermediate correction value by proportionally integrating the deviation calculated by the subtracter, an adder that calculates a second correction value by adding a predetermined value to the intermediate correction value calculated by the PI calculator, a correction command unit that detects that the deviation between the turbine output and the planned maximum output falls within an allowable value, and issues a combustion load variable correction command, a switching unit that enters an open state, based on the combustion load variable correction command issued from the correction command unit, a data storage unit that stores the second correction value output from the adder as the first correction value through the switching unit, and outputs the first correction value, a first maximum load multiplier that takes in the first correction value output from the data storage unit and that has a first correction coefficient to be updated to the first correction value, and a second maximum load multiplier that takes in the second correction value from the adder and that has a second correction coefficient to be updated to the second correction value.

INDUSTRIAL APPLICABILITY

In an aspect of the present disclosure, the combustion tolerance confirmation work is made efficient regardless of the skill of a worker, and the combustion adjustment work is facilitated. Further, the reliability of the gas turbine is improved.

REFERENCE SIGNS LIST 1 gas turbine
2 compressor
3 combustor
4 turbine
5 electric generator
11 inlet guide vane
24 transition piece
30 combustion nozzle
31 main nozzle
32 top hat nozzle
33 pilot nozzle
41 main fuel flow rate control valve
42 top hat fuel flow rate control valve
43 pilot fuel flow rate control valve
44 bypass valve
100 combustion control device
101 process measuring unit 101
102 pressure change measurement unit
103 acceleration measurement unit
104 NOx measurement unit
110 control unit
121 input unit
122 operating state ascertaining unit
123 frequency analysis unit
124 combustion characteristic ascertaining unit
125 correction unit
126 output unit
127 database
130 combustion tolerance adjustment unit
132 combustion tolerance confirmation unit
134 combustion load variable correction unit
134a maximum load correction unit
134b setting value conversion unit
136 setting value change unit
141 function generator (planned maximum output)
142 function generator (no-load equivalent output)
143, 145,150 subtracter
144, 147 divider
148, 149 multiplier
151 PI calculator
151a intermediate correction value
152 adder
152a second correction value
153 signal generator
154 switching unit
154a first correction value
155 data storage unit
156 first maximum load multiplier
156a first correction coefficient
157 second maximum load multiplier
157a second correction coefficient
160 correction command unit
161 combustion load variable correction command
PL pilot ratio
TH top hat ratio
BV bypass valve opening degree
CLP combustion load variable
GTIT gas turbine inlet temperature
PM combustion parameter
PM1 first combustion parameter
PM2 second combustion parameter
PM3 third combustion parameter
S stage
SW stage width
CM command value
CM1 first command value
CM2 second command value
CM3 third command value
OP origin
OP1 first origin
OP2 second origin
OP3 third origin
NOP, NOP1, NOP2, NOP3 new origin
WST origin movement width
PR1 first step
PR2 second step
STU increase command step
STD decrease command step
TMW, TMW1, TMW2, TMW3 target tolerance width
TMUL target tolerance upper limit value
TMLL target tolerance lower limit value
AMUL actual tolerance upper limit value
AMLL actual tolerance lower limit value
T1 first retention time
T2 second retention time
T0 unreached time
BRR command value cancellation rate (first predetermined rate)
BIR command value input rate (second predetermined rate)
α predetermined value
MOP planned maximum load (planned maximum output)
NOP no-load equivalent output

The invention claimed is:

1. A combustion adjustment method of a gas turbine, which is applied to combustion control of a combustor, the method comprising:
a step of selecting a combustion parameter for setting a fuel-air ratio with respect to a load of the gas turbine;
a step of executing a first step that includes a first increase command step, which is an increase command step of increasing a command value of the combustion parameter, or a first decrease command step, which is a decrease command step of decreasing the command value, from a position of an origin;
a step of ending the first step and returning the command value of the combustion parameter to the position of the origin, when the command value reaches a target tolerance upper limit value or a target tolerance lower limit value without occurrence of combustion oscillation in the combustor;

a step of executing a second step that includes a second decrease command step, which is a decrease command step of decreasing the command value in a direction opposite to that in that in the first step from the position of the origin, or a second increase command step, which is an increase command step of increasing the command value; and a step of ending the second step and returning the command value of the combustion parameter in the second step to the position of the origin, when the command value in the second step reaches the target tolerance lower limit value or the target tolerance upper limit value without occurrence of combustion oscillation in the combustor, wherein the method further comprises a combustion tolerance confirmation step of confirming a combustion tolerance range of the combustion parameter.

2. The combustion adjustment method of a gas turbine according to claim 1, wherein the combustion tolerance confirmation step is a step of confirming the combustion tolerance range of a first combustion parameter of the combustion parameters, and the origin, the command value, the target tolerance upper limit value, and the target tolerance lower limit value of the first combustion parameter are a first origin, a first command value, a first target tolerance upper limit value, and a first target tolerance lower limit value.

3. The combustion adjustment method of a gas turbine according to claim 2, wherein the combustion tolerance confirmation step is a step of confirming the combustion tolerance range of a second combustion parameter of the combustion parameters, and the origin, the command value, the target tolerance upper limit value, and the target tolerance lower limit value of the second combustion parameter are a second origin, a second command value, a second target tolerance upper limit value, and a second target tolerance lower limit value.

4. The combustion adjustment method of a gas turbine according to claim 3, wherein the combustion tolerance confirmation step is a step of confirming the combustion tolerance range of a third combustion parameter of the combustion parameters, and the origin, the command value, the target tolerance upper limit value, and the target tolerance lower limit value of the third combustion parameter are a third origin, a third command value, a third target tolerance upper limit value, and a third target tolerance lower limit value.

5. The combustion adjustment method of a gas turbine according to claim 1, further comprising:

a combustion load variable correction step that includes a maximum load correction step of correcting a setting value of a combustion load variable for which the combustion tolerance range of the acquired combustion parameter is confirmed, such that the combustion load variable with respect to planned maximum output becomes a rated value, and a setting value conversion step of converting the setting value of the combustion load variable calculated in the maximum load correction step while maintaining a relationship between the combustion parameter and a gas turbine inlet temperature.

6. The combustion adjustment method of a gas turbine according to claim 1, wherein the combustion tolerance confirmation step is executed in response to a combustion load variable indicating a load of the gas turbine.

7. The combustion adjustment method of a gas turbine according to claim 1, wherein the combustion tolerance confirmation step includes a step of selecting a degree of priority of the combustion parameter and a degree of priority of a change pattern of the command value of the combustion parameter in response to a combustion load variable indicating a load of the gas turbine.

8. The combustion adjustment method of a gas turbine according to claim 1, wherein when the command value is returned to the position of the origin after the first step or the second step has ended, the command value is decreased or increased at a first predetermined rate.

9. The combustion adjustment method of a gas turbine according to claim 1, wherein the increase command step or the decrease command step of the first step or the second step includes a step of increasing or decreasing the command value along a stepped stage from the position of the origin, and a step of maintaining a first retention time without occurrence of combustion oscillation in the stage after the command value is increased or decreased by one stage.

10. The combustion adjustment method of a gas turbine according to claim 9, wherein the increase command step or the decrease command step of the first step or the second step includes a step of increasing or decreasing the command value at a second predetermined rate when the command value is increased or decreased by one stage.

11. The combustion adjustment method of a gas turbine according to claim 9, wherein the increase command step or the decrease command step of the first step or the second step includes a step of collecting steady data while maintaining a second retention time from a point in time when the first retention time has elapsed at the command value, in a case where the command value is maintained at the stage where the command value reaches the target tolerance upper limit value or the target tolerance lower limit value, and the first retention time is reached at the stage without occurrence of combustion oscillation.

12. The combustion adjustment method of a gas turbine according to claim 10, wherein the combustion tolerance confirmation step includes a step of setting the command value of a stage immediately before combustion oscillation occurs as an actual tolerance upper limit value, returning the command value to the position of the origin, and ending the first step, in a case where in the increase command step of the first step, combustion oscillation occurs before the command value of the combustion parameter reaches the target tolerance upper limit value, or in a case where combustion oscillation occurs after the command value of the combustion parameter reaches a stage that is the target tolerance upper limit value and before the first retention time is reached at the command value, a step of calculating a difference between the number of stages between the position of the origin and the target tolerance upper limit value and the number of stages between the position of the origin and the actual tolerance upper limit value in the increase command step of the first step, in the decrease command step of the second step in a direction opposite to that in the increase command step of the first step, and setting a value obtained by adding the difference in the command value corresponding to the difference in the number of stages of the first step in a direction of decreasing the command value in the second step to the target tolerance lower limit value in the decrease command step of the second step, as an actual tolerance lower limit value, a step of executing the decrease command step from the position of the origin of the decrease command step of the second step to the actual tolerance lower limit value without occurrence of combustion oscillation at the command value of the combustion parameter, and a step of setting a new origin at a position moved by the difference in the number of stages in the first step in the direction of decreasing the command value in the second step with respect to the position of the origin.

13. The combustion adjustment method of a gas turbine according to claim 1, wherein the combustion tolerance confirmation step includes a step of setting the command value of the stage immediately before combustion oscillation occurs as an actual tolerance lower limit value, returning the command value to the position of the origin, and ending the first step, in a case where in the decrease command step of the first step, combustion oscillation occurs before the command value of the combustion parameter reaches the target tolerance lower limit value, or in a case where combustion oscillation occurs after the command value of the combustion parameter reaches a stage that is the target tolerance lower limit value and before the first retention time is reached at the command value, a step of calculating a difference between the number of stages between the position of the origin and the target tolerance lower limit value and the number of stages between the position of the origin and the actual tolerance lower limit value in the decrease command step of the first step, in the increase command step of the second step in a direction opposite to that in the decrease command step of the first step, and setting a value obtained by adding the difference in the command value corresponding to the difference in the number of stages of the first step in a direction of increasing the command value in the second step to the target tolerance upper limit value in the increase command step of the second step, as an actual tolerance upper limit value, a step of executing the increase command step from the position of the origin to the actual tolerance upper limit value without occurrence of combustion oscillation at the command value of the combustion parameter, in the increase command step of the second step, and a step of setting a new origin at a position moved by the difference in the number of stages in the first step in the direction of increasing the command value in the second step with respect to the position of the origin.

14. The combustion adjustment method of a gas turbine according to claim 9, wherein the combustion tolerance confirmation step includes a step of executing the increase command step or the decrease command step of the first step from the position of the origin, setting the command value of the stage immediately before combustion oscillation occurs as an actual tolerance upper limit value or an actual tolerance lower limit value, and setting the actual tolerance upper limit value or the actual tolerance lower limit value as a first setting value in the first step, in a case where combustion oscillation occurs before the command value of the stage reaches the target tolerance upper limit value or the target tolerance lower limit value, or in a case where combustion oscillation occurs after the command value of the stage reaches the target tolerance upper limit value or the target tolerance lower limit value and before the first retention time is reached, executing the decrease command step or the increase command step of the second step in a direction opposite to that in the increase command step or the decrease command step of the first step from the position of the origin, setting the command value of the stage immediately before combustion oscillation occurs as the actual tolerance lower limit value or the actual tolerance upper limit value in the second step, and setting the actual tolerance upper limit value or the actual tolerance lower limit value in the second step as a second setting value in the second step, in a case where combustion oscillation occurs before the command value of the stage reaches the target tolerance lower limit value or the target tolerance upper limit value, or in a case where combustion oscillation occurs after the command value of the stage reaches the target tolerance lower limit value or the target tolerance upper limit value and before the first retention time is reached, and setting a middle position between the first setting value and the second setting value as a new origin.

15. The combustion adjustment method of a gas turbine according to claim 12, wherein the combustion tolerance confirmation step includes a step of collecting steady data while maintaining a second retention time from a point in time when combustion oscillation occurs, at the command value that is one stage lower or one stage higher than the command value at which combustion oscillation occurs, in a case where combustion oscillation occurs in the increase command step or the decrease command step of the first step or the second step and the position of the new origin is selected by moving the position of the origin.

16. The combustion adjustment method of a gas turbine according to claim 12, wherein the combustion tolerance confirmation step includes a setting value change step of setting a combustion load variable closest to a setting value of an initial origin as an origin at a time of operation and executing the combustion tolerance confirmation step, and changing the setting value of the initial origin to the setting value of the new origin in a case where the setting value of the initial origin is changed and the new origin is set.

17. The combustion adjustment method of a gas turbine according to claim 5, wherein the maximum load correction step includes a step of calculating a second correction value by calculating an intermediate correction value by proportionally integrating a deviation between turbine output and the planned maximum output, and adding a predetermined value to the intermediate correction value, a step of issuing a combustion load variable correction command when an elapsed time has elapsed a predetermined time after execution of the combustion load variable correction step has started, a step of replacing the second correction value with a first correction value via a switching unit, based on the combustion load variable correction command, and resetting the second correction value, and a step of updating a first correction coefficient to the first correction value, based on the combustion load variable correction command.

18. The combustion adjustment method of a gas turbine according to claim 17, wherein the maximum load correction step further includes a step of updating a second correction coefficient to the second correction value.

19. The combustion adjustment method of a gas turbine according to claim 17, wherein in the setting value conversion step, the gas turbine inlet temperature is corrected based on the first correction coefficient.

20. A combustion control device of a gas turbine comprising:
- a control unit that controls an operating state of the gas turbine;
- an automatic combustion adjustment unit that controls combustion oscillation; and
- a combustion tolerance adjustment unit that selects a combustion tolerance range of a combustion parameter in which combustion oscillation does not occur with respect to a load of the gas turbine, and sends the selected combustion tolerance range to the automatic combustion adjustment unit,
- wherein the combustion tolerance adjustment unit includes:
  - a combustion tolerance confirmation unit that confirms a combustion tolerance range of the combustion parameter according to the load of the gas turbine;
  - a combustion load variable correction unit that corrects a setting value of a combustion load variable with respect to the combustion parameter and that sets a new setting value; and
  - a setting value change unit that corrects, in a case where a new origin is set in the combustion tolerance confirmation unit, a relationship between the combustion parameter and the combustion load variable, based on the new origin.

21. The combustion control device of a gas turbine according to claim 20, wherein the combustion load variable correction unit includes
- a maximum load correction unit that corrects the combustion load variable, which is provided with a first correction coefficient for correcting the combustion load variable such that the combustion load variable with respect to planned maximum output becomes a rated value, and in which the first correction coefficient is updated to a first correction value calculated such that a deviation between turbine output and the planned maximum output falls within an output deviation allowable value, and
- a setting value conversion unit that corrects a gas turbine inlet temperature, based on the first correction coefficient, so as to maintain a relationship between the combustion parameter and the gas turbine inlet temperature, based on the combustion load variable after correction.

22. The combustion control device of a gas turbine according to claim 21, wherein the maximum load correction unit includes
- a subtracter that calculates the deviation between the turbine output and the planned maximum output,
- a PI calculator that calculates an intermediate correction value by proportionally integrating the deviation calculated by the subtracter,
- an adder that calculates a second correction value by adding a predetermined value to the intermediate correction value calculated by the PI calculator,
- a correction command unit that detects that the deviation between the turbine output and the planned maximum output falls within an allowable value, and issues a combustion load variable correction command,
- a switching unit that enters an open state, based on the combustion load variable correction command sent from the correction command unit,
- a data storage unit that stores the second correction value output from the adder as the first correction value through the switching unit, and outputs the first correction value,
- a first maximum load multiplier that takes in the first correction value output from the data storage unit and that has the first correction coefficient to be updated to the first correction value, and
- a second maximum load multiplier that takes in the second correction value from the adder and that has a second correction coefficient to be updated to the second correction value.

* * * * *